United States Patent
Ahlin et al.

(10) Patent No.: US 8,819,073 B2
(45) Date of Patent: Aug. 26, 2014

(54) METHOD FOR MANAGING A DIRECTORY, CONTROLLER, SYSTEM INCLUDING SERVERS, AND COMPUTER PROGRAM

(75) Inventors: Fredrik Ahlin, Karlskrona (SE); Susana Gomez Maturana, Madrid (ES); Santiago Munoz Munoz, Madrid (ES); Antonio Roque-Alvarez, Meco (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 46 days.

(21) Appl. No.: 13/257,077

(22) PCT Filed: Apr. 2, 2009

(86) PCT No.: PCT/EP2009/053935
§ 371 (c)(1),
(2), (4) Date: Sep. 16, 2011

(87) PCT Pub. No.: WO2010/112076
PCT Pub. Date: Oct. 7, 2010

(65) Prior Publication Data
US 2012/0005235 A1    Jan. 5, 2012

(51) Int. Cl.
*G06F 7/00* (2006.01)
*G06F 17/30* (2006.01)
*H04L 29/12* (2006.01)

(52) U.S. Cl.
CPC ........ *H04L 61/1517* (2013.01); *H04L 61/1588* (2013.01); *H04L 61/1523* (2013.01); *H04L 29/12188* (2013.01)
USPC ....................................................... 707/797

(58) Field of Classification Search
CPC ........................................................ G06F 17/30
USPC ........................................................ 707/797
See application file for complete search history.

(56) References Cited

U.S. PATENT DOCUMENTS 7,634,513 B2 * 12/2009 Harvey ................................. 1/1
7,685,142 B2 * 3/2010 Harvey ................... 707/999.101
(Continued)

FOREIGN PATENT DOCUMENTS

WO    WO 2008/122650    10/2008

OTHER PUBLICATIONS

International Search Report for PCT/EP2009/053935, mailed Nov. 19, 2009.
(Continued)

*Primary Examiner* — Rehana Perveen
*Assistant Examiner* — Raheem Hoffler
(74) *Attorney, Agent, or Firm* — Nixon & Vanderhye, P.C.

(57) ABSTRACT

In a method for managing a directory (10) stored on at least one server (8), the directory (10) includes entries (12) arranged in a tree structure. Each entry (12) includes at least one attribute. An alias entry (12$_A$) includes an attribute pointing to a target entry (12$_T$). The method includes assigning to an application (14) an owner role in relation to an alias entry (12$_A$). An application (14) is referred to as owner of the alias entry (12$_A$). The method further includes requesting, by an application (14), deletion of the alias entry (12$_A$), determining if a deletion condition is satisfied, and, if so, deleting the alias entry (12$_A$). The deletion condition includes that the application (14) is the only owner of the alias entry (12$_A$). A controller (30) for managing a directory (10), a server (8) including a directory (10), a system, and a computer program are also disclosed.

18 Claims, 13 Drawing Sheets

(56) References Cited

U.S. PATENT DOCUMENTS

| | | | |
|---|---|---|---|
| 7,814,554 B1* | 10/2010 | Ragner | 726/27 |
| 8,185,548 B2* | 5/2012 | Lim | 707/781 |
| 2002/0083340 A1 | 6/2002 | Eggebraaten et al. | |
| 2005/0102297 A1 | 5/2005 | Lloyd et al. | |
| 2008/0091739 A1* | 4/2008 | Bone et al. | 707/200 |
| 2009/0192976 A1* | 7/2009 | Spivack et al. | 706/55 |
| 2010/0274769 A1* | 10/2010 | Hazlewood et al. | 707/679 |

OTHER PUBLICATIONS

Written Opinion of the International Searching Authority for PCT/EP2009/053935, mailed Nov. 19, 2009.

Howes T.A., *An X.500 and LDAP Database: Design and Implementation*, University of Michigan, Dec. 2003.

Zeilenga, K., "Lightweight Directory Access Protocol (LDAP): Technical Specification Road Map", RFC 4510, Jun. 2006.

Kurt D. Zeilenga, "LDAP Transactions <draft-zeilenga-ldap-txn-09.txt>", IETF, Oct. 22, 2006.

Sermersheim, J., "Lightweight Directory access protocol (LDAP): The Protocol", IETF, RFC 4511, Jun. 2006.

Zeilenga, "LDAP Transactions", Internet-Draft <draft-zeilenga-ldap-txn-09.txt>, OpenLDAP Foundation, Oct. 22, 2006.

RFC 4511, Sermersheim, "Lightweight Director Access Protocol (LDAP): The Protocol", Novell, Inc., Jun. 2006.

* cited by examiner

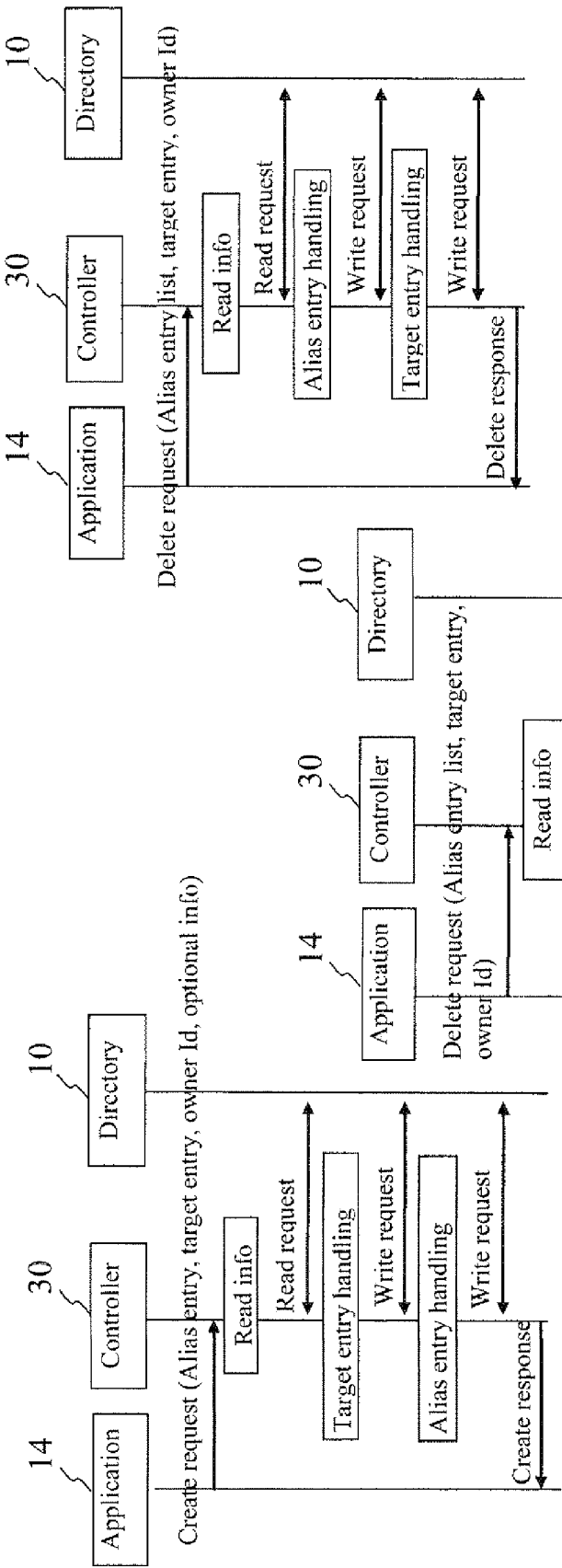

US 8,819,073 B2

METHOD FOR MANAGING A DIRECTORY, CONTROLLER, SYSTEM INCLUDING SERVERS, AND COMPUTER PROGRAM

This application is the U.S. national phase of International Application No. PCT/EP2009/053935, filed 2 Apr. 2009, which designated the U.S., the entire content of which is hereby incorporated by reference.

TECHNICAL FIELD

The present invention relates to a method for managing a directory. The invention also relates to a controller for managing a directory, to a server including a directory, to a system for managing a directory, and to a computer program for carrying out the method for managing a directory.

BACKGROUND

A directory service is a software application enabling the access to and management of a set of information entities, also called objects or entries, and associated attributes. The set of objects or entries is called a directory. The objects or entries in the directory may refer to persons, organization units, computer resources, documents or anything else. The attributes may be phone numbers, organization units' name, computers' or documents' characteristics, etc. Functions are usually provided to search, browse and update the directory.

The Lightweight Directory Access Protocol (LDAP) is an example of protocol for accessing directory trees through TCP/IP. LDAP is widely supported. A client starts a LDAP session by connecting to a LDAP server, and the client can send an operation request to the LDAP server, for instance to search for a directory entry or to add, delete or modify an entry.

An object or entry in the directory has one or more attributes. Each attribute has one name (or key) and one or more values associated with the name (or key). A particular type of entry is an alias entry, i.e. an entry including an attribute pointing to another entry. In the exemplary context of X.500 and LDAP, Howes T. A., *An X.500 and LDAP Database: Design and Implementation*, University of Michigan, Dec. 2003, discloses alias entries in a directory (see page 1, bottom of right-hand column: "Alias entries are allowed, which point to other entries, circumventing the hierarchy" and page 2, FIG. 1).

It is desirable to provide methods, controllers, servers, systems and computer programs to improve the handling of adding and deleting operations in relation to entries in such directories, notably by aiming at more reliability without increasing the signalling and architecture complexity.

SUMMARY

Such methods, controllers, servers, systems and computer programs are defined in the independent claims. Advantageous embodiments are defined in the dependent claims.

In one embodiment, the method is for managing a directory stored on at least one server. The directory includes a plurality of entries arranged in a tree structure, wherein each entry includes at least one attribute. The directory is configured so that a first entry can include an attribute pointing to a second entry, here referred to as target entry, the first entry being here referred to as alias entry of the target entry. The method includes assigning to an application an owner role in relation to an alias entry. An application to which an owner role is assigned in relation to an alias entry is here referred to as owner of the alias entry. The method further includes requesting, by an application which is either owner of the alias entry or not, deletion of the alias entry. The method then includes determining if a condition, here referred to as deletion condition, is satisfied, and, if so, deleting the alias entry. The deletion condition includes that the application is the only owner of the alias entry.

The method provides for efficient and reliable deletion of alias entries by subjecting their deletion to a condition. The advantages of the invention are particular apparent when independent requests for deleting an entry are to be handled. If a request for deletion of a directory entry comes from an application to which an owner role has not been assigned in relation to the alias entry or from an application to which an owner role has been assigned in relation to the alias entry but which is not the only owner of the alias entry, then the deletion of the alias entry will not be carried out. Thus, the alias entry is preserved for proper use by another application which has an owner role in relation to the alias entry. Preserving such proper use of alias entries by owner applications improves the reliability of the directory service and provides for a method being less prone to errors.

As mentioned above, the deletion condition includes that the application is the only owner of the alias entry. In one embodiment, satisfying that the application is the only owner of the alias entry is sufficient for the deletion to be carried out. In another embodiment, that the application is the only owner of the alias entry is a necessary but not sufficient condition for deleting the alias entry. In other words, satisfying the deletion condition, by an application, includes in this embodiment more than being the only owner of the alias entry.

In one embodiment, the deletion condition consisting in that the application is the only owner of the alias entry means that the application is the last owner of the alias entry. This applies in particular when an alias entry may be owned or has been owned (at the time of evaluating the deletion condition) by more than one application. The advantages of this embodiment will become more fully apparent later in the description, in view of the drawings.

A server is herewith a computer connected to a network and including a processor configuring for receiving requests for information stored on a storage device attached to the processor.

The step of assigning to an application an owner role in relation to an alias entry may occur notably when an application creates an alias entry to access a target entry. This does not however exclude that an alias entry be used by an application which does not have an owner role in relation to the alias entry. This may for instance occur if the application depends on a second application which is already owner of the alias entry, and if it is known for instance that the second application will not delete the alias entry during a certain period.

The step of assigning to an application an owner role in relation to an alias entry may also occur when an application starts to use an existing alias entry (if sharing of an alias entry is permitted by the directory configuration).

The step of assigning to an application an owner role in relation to an alias entry may also occur well after the application started to use the alias entry. In other words, an application may create an alias entry, use it for a while without being owner of the alias entry, and then decide to become owner of the alias entry (if the alias entry still exists, as this is not guaranteed at that stage) in order to add a guarantee that the alias entry will not be deleted "without its consent". The same applies mutatis mutandis to the step of assigning to an application a user role in relation to a target entry, which will be explained later.

The step of assigning to an application an owner role in relation to an alias entry may further occur in the event that an existing directory is converted to an owner-role enabled directory. In other words, assigning to an application an owner role in relation to an alias entry may occur well after the creation of the alias entry and well after the application started to use the alias entry. The same applies mutatis mutandis to the step of assigning to an application a user role in relation to a target entry, which will be explained later.

The step of assigning to an application an owner role may for instance be implemented by storing the information as to which application is owner of the alias entry in an attribute of the alias entry itself.

When an owner application requests the deletion of an alias entry and if the deletion condition is not satisfied because the requesting application is not the only owner, the owner application releases or abandons its owner role (or is regarded as having released or abandoned its owner role, i.e. as having no more reserving right on the alias entry, for the purpose of the subsequent steps of the method). Otherwise, the situation may lead to many owner applications keeping their owner roles, even after having requested deletion of the alias entry and all waiting to become to only owner remaining (with the alias entry being never deleted as a result).

In one embodiment, the method further includes assigning to an application a user role in relation to a target entry. An application to which a user role is assigned in relation to a target entry is here referred to as user of the target entry. Furthermore, requesting deletion of the alias entry further includes requesting deletion of the target entry to which the alias entry points. If, in the determining step, the deletion condition is determined to be satisfied, deleting further includes deleting the target entry. Finally, the deletion condition further includes that the application is the only user of the target entry.

This provides efficient and reliable management of the deletion of both alias entries and target entries, when the use of target entries is combined with the use of alias entries. More advantages of this embodiment when managing deletion requests related to shared target entries, i.e. with multiple users of the same target entries, will also become more fully apparent later in the description and in view of the drawings.

In one embodiment, the deletion condition includes that the application is the only owner of the alias entry and is the only user of the target entry. In this embodiment, when an owner and user application requests the deletion of an alias entry and the associated target entry and if the deletion condition is not satisfied because the requesting application is not the only owner or not the only user, the owner and user application releases or abandons its owner and user roles (or is regarded as having released or abandoned its owner and user role, i.e. as having no more reserving right on the alias entry and target entry, for the purpose of the subsequent steps of the method).

In one embodiment, since, if an application is the only user of a target entry, it is also necessarily the only owner of the alias entry through which the application accesses the target entry, it is sufficient, for deleting a target entry, to determine that the application is the only owner of the alias entry and the only user of the target entry. In one embodiment, the method is further such that assigning to an application a user role in relation to a target entry further includes setting to a next value an attribute, here referred to as user number attribute, associated with the target entry. Whether the application is the only user of the target entry is determined at least by setting to a previous value the user number attribute, and, if the user number attribute is as a result equal to a reference value, the application is determined to be the only user of the target entry.

This embodiment provides a user number attribute acting as counter associated with a target entry, so as to handle the deletion of alias entries and target entries, with simple and efficient signalling and processing. In one sub-embodiment of this embodiment, setting to a next value an attribute is carried out by incrementing the attribute, setting to a previous value an attribute is carried out by decrementing the attribute, and the reference value is zero. The increment step and decrement step need not be equal to one, but must be equal to each other in absolute value.

In one embodiment, the method is such that the directory is further configured so that each alias entry can belong to more than one owner application. This embodiment provides efficient deletion management for shared and/or shareable alias entries.

In one embodiment, the method is further such that assigning to an application an owner role in relation to an alias entry further includes setting to a next value an attribute, here referred to as owner number attribute, associated with the alias entry; and whether the application is the only owner of the alias entry is determined at least by setting to a previous value the owner number attribute, and wherein, if the owner number attribute is as a result equal to a reference value, the application is determined to be the only owner of the alias entry.

This embodiment provides an owner number attribute acting as counter associated with an alias entry, so as to handle the deletion of alias entries, and especially shared and/or shareable alias entries, with efficient and simple signaling. In one sub-embodiment of this embodiment, setting to a next value an attribute is carried out by incrementing the attribute, setting to a previous value an attribute is carried out by decrementing the attribute, and the reference value is zero. Also here, the increment step and decrement step need not be equal to one, but must be equal to each other in absolute value.

The invention also relates to a controller for managing a directory stored on at least one server. The directory includes a plurality of entries arranged in a tree structure, wherein each entry includes at least one attribute. The directory is configured so that a first entry can include an attribute pointing to a second entry, here referred to as target entry, the first entry being then here referred to as alias entry of the target entry. The controller includes an assignor configured for assigning to an application an owner role in relation to an alias entry, wherein an application to which an owner role is assigned in relation to an alias entry is here referred to as owner of the alias entry. The controller also includes a receiver configured for receiving a request, from an application which is either owner of the alias entry or not, to delete the alias entry. The controller further includes a determiner configured for determining if a condition, here referred to as deletion condition, is satisfied, and, if so, deleting the alias entry. The deletion condition includes that the application is the only owner of the alias entry.

The controller centralizes the function of handling the requests for deletion of alias entries. The operation atomicity may be guaranteed by the controller. Deletion, as well as creation (as will be explained later in the description), operations may be atomic, in the sense that the deletion and creation operations follow an "all or nothing" rule. If one part of the operation (called a transaction) fails, the entire operation fails. This ensures that entries are either created or not in the directory. This also ensures that entries are either properly deleted or instead remains in a proper state in the directory.

The invention also relates to a server including a directory, wherein the directory includes a plurality of entries arranged in a tree structure, and each entry includes at least one attribute. The directory is configured so that a first entry can include an attribute pointing to a second entry, here referred to as target entry, the first entry being then here referred to as alias entry of the target entry. The directory further includes at least one of an attribute associated with a target entry, the attribute including a value representing a number of applications using the target entry, so that it can be determined based on the attribute whether an application is the only user of the target entry; and an attribute associated with an alias entry, the attribute including a value representing a number of applications owning the alias entry, so that it can be determined based on the attribute whether an application is the only owner of the alias entry.

The invention also relates to a system including at least one server, here referred to collectively as directory server, including a directory. The directory includes a plurality of entries arranged in a tree structure, wherein each entry includes at least one attribute. The directory is configured so that a first entry can include an attribute pointing to a second entry. The system also includes a server, here referred to as controller server, including a controller as described above. The system further includes at least one server, each referred to here as application-hosting server and each hosting at least one application configured to interact with the directory server through the controller server, and configured at least to send a request, to the controller server, to delete an alias entry of the directory.

The invention also relates to a computer program including instructions configured, when executed on a computer, to cause the computer to carry out any one of the above-described methods.

Any one of the above-mentioned embodiments and of those described in the detailed description below may be combined together to form further embodiments, to the extent that they are not mutually exclusive.

BRIEF DESCRIPTION OF THE DRAWINGS

Embodiments of the present invention shall now be described, in conjunction with the appended figures, in which:

FIG. 4 is a flow chart of a method in one embodiment of the invention;

FIGS. 15 to 17 schematically illustrate the handling of requests for creation and deletion in embodiments of the methods of the invention;

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
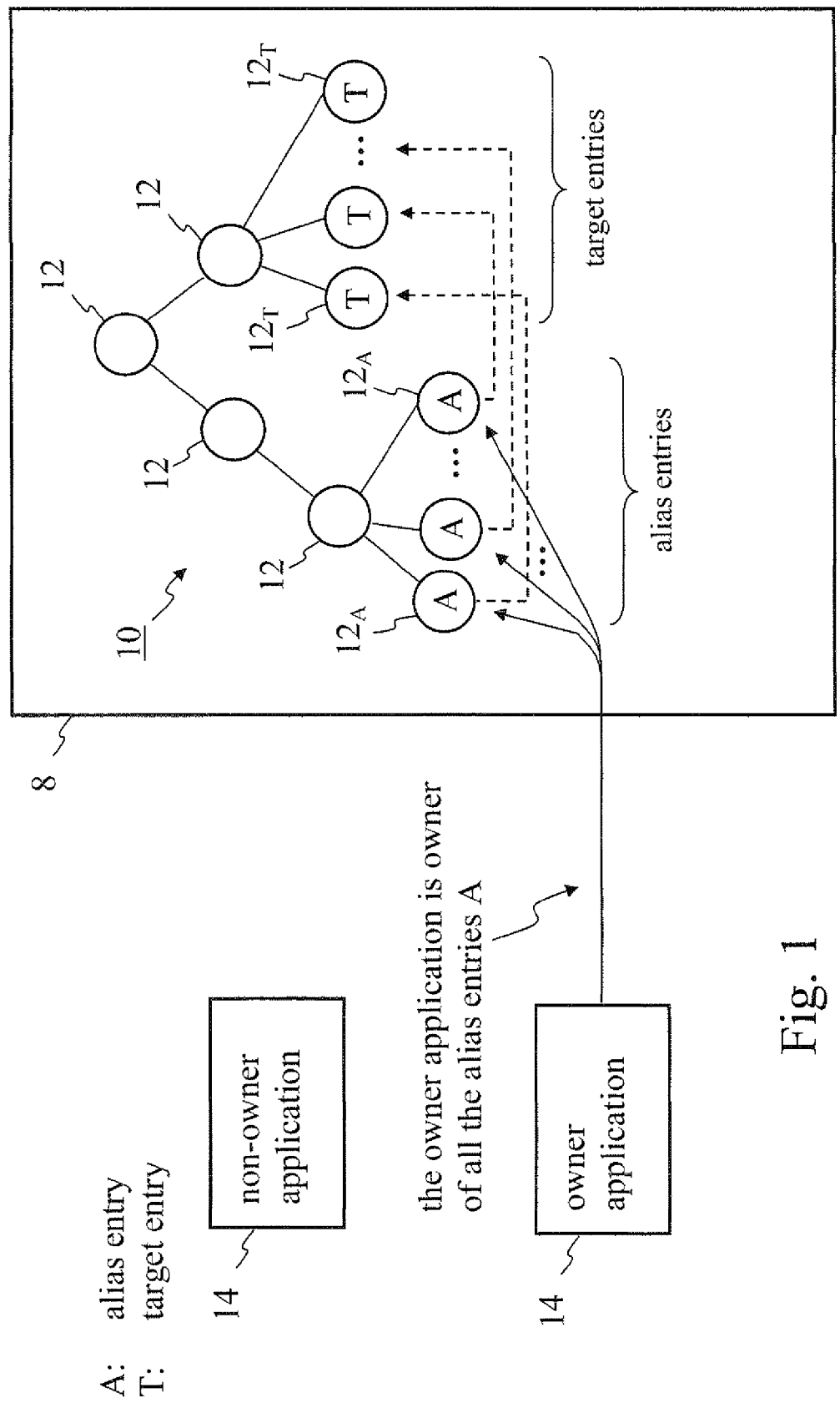
FIG. 1 schematically illustrates an application and entries of a directory in one embodiment of the invention.

FIG. 1 schematically illustrates a directory server 8 including a directory 10. Although the directory 10 is illustrated as being hosted, i.e. stored, on one server 8, the directory 10 may also be stored in a distributed manner, on more than one server 8.

The directory 10 includes a plurality of entries 12 arranged in a tree structure. Each entry 12 includes at least one attribute made of a key or name and one or more values (not illustrated). The entry 12 at the top of the tree is called the root entry 12. Some entries $12_A$ point to other entries $12_T$. An entry $12_A$ pointing to another entry $12_T$ is an alias entry $12_A$. The alias entries $12_A$ are labelled with "A" in the figures. An entry $12_T$ to which an alias entry $12_A$ points is a target entry $12_T$. A target entry $12_T$ is labelled with "T" in the figures. The dashed arrows illustrate that each alias entry $12_A$ points to a target entry $12_T$.

An application 14 can access the content of a target entry $12_T$ through an alias entry $12_A$ pointing to the target entry $12_T$. If an application 14 using an alias entry $12_A$ has been assigned an owner role in relation to the alias entry $12_A$, the application 14 is referred to as owner, or owner application, of the alias entry $12_A$. An owner role is a type of reserving right that an application 14 may have on an alias entry $12_A$.

If an application 14 is not the only owner of an alias entry $12_A$ and if it requests deletion of the alias entry $12_A$, it is determined that the deletion condition is not satisfied since the application 14 is not the only owner of the alias entry $12_A$. The deletion of the alias entry $12_A$ is thus not carried out. If, however, the application 14 is the only owner of the alias entry $12_A$, the deletion condition may be satisfied, depending on whether the deletion condition is limited to being the only owner of the alias entry $12_A$, or if other subconditions need to be satisfied.

Figure 2:
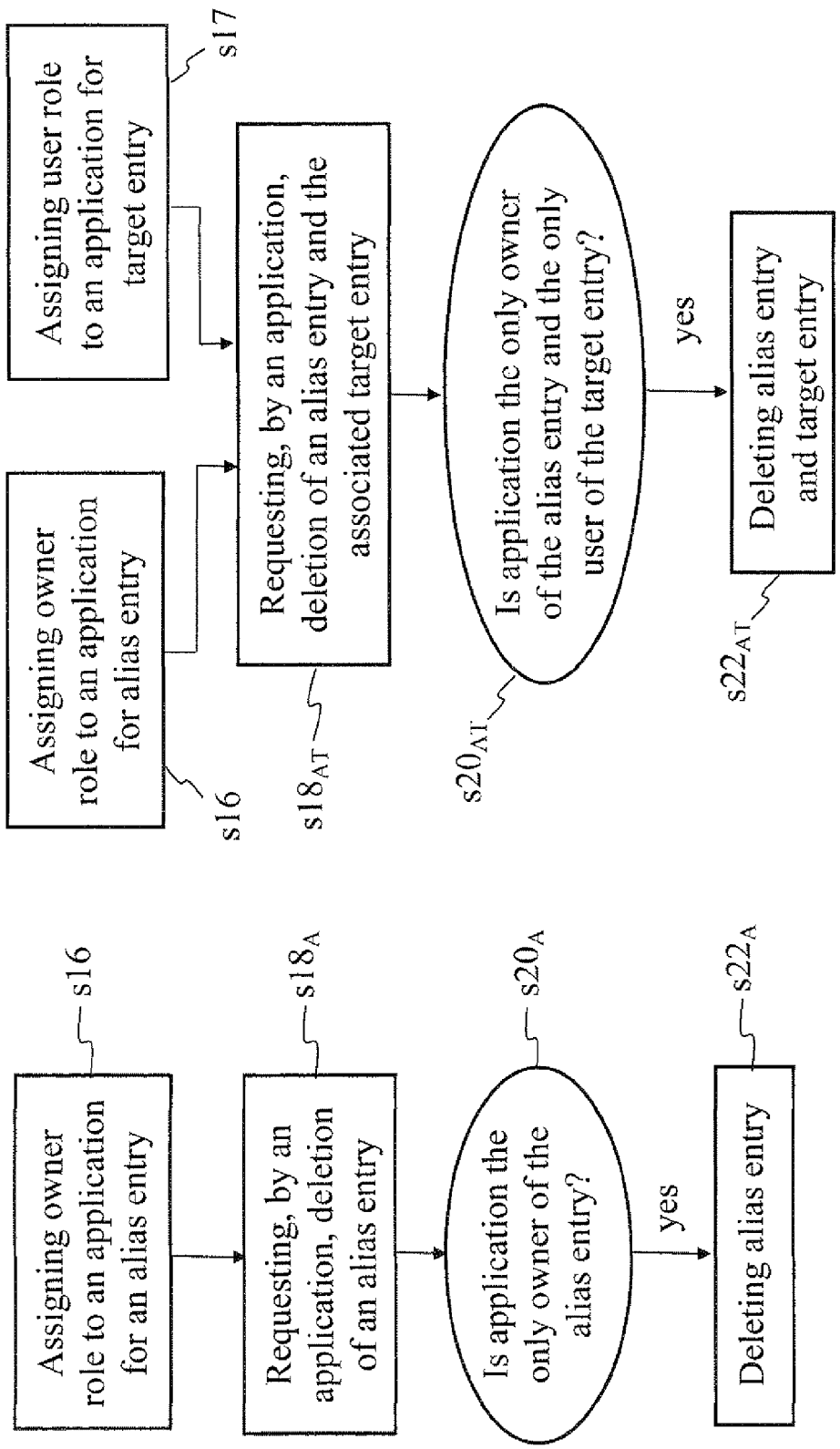
FIG. 2 is a flow chart of a method in one embodiment of the invention.

FIG. 2 is a flow chart of an embodiment of the method of the invention, wherein an owner role is assigned s16 to an application 14 for, or in relation to, an alias entry $12_A$. Then, if an application 14 (i.e. the application 14 mentioned in relation to step s16 or another application 14, whether it has an owner role or not in relation to the alias entry $12_A$) requests s18$_A$ deletion of an alias entry 12$_A$, it is determined s20$_A$ whether the application 14 is the only owner of the alias entry 12$_A$. If so, the alias entry 12$_A$ is deleted s22$_A$. This flow chart illustrates an embodiment wherein being the only owner of an alias entry 12$_A$ is sufficient to lead to the deletion s22$_A$ of the alias entry 12$_A$. As mentioned above, the deletion condition may however include further sub-conditions for an alias entry 12$_A$ to be deleted s22$_A$.

Figure 3:
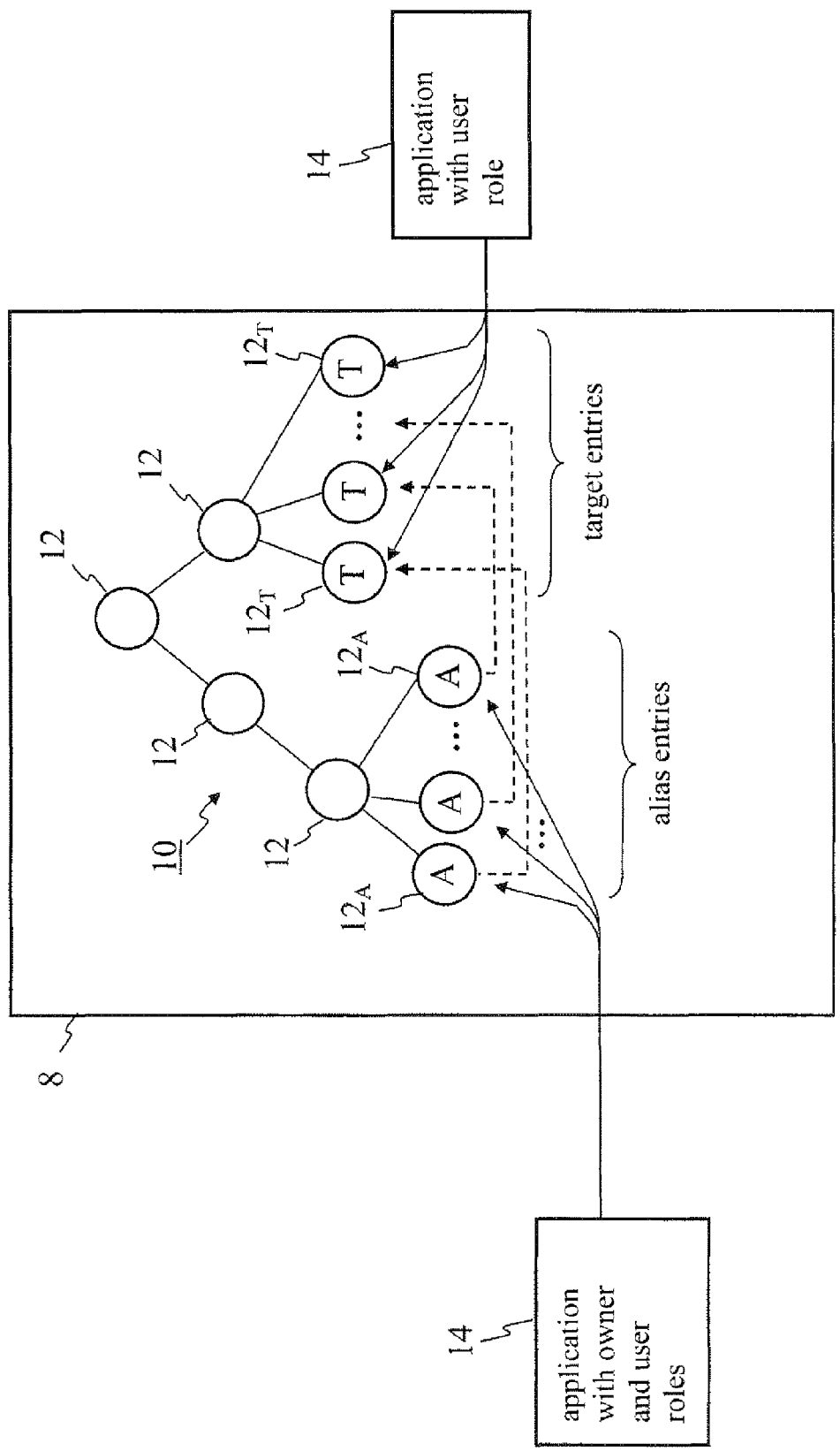
FIG. 3 schematically illustrates two applications and the entries of a directory in one embodiment of the invention.

FIG. 3 illustrates a directory 10 hosted on a directory server 8. The directory is similar to the one illustrated in FIG. 1. In this embodiment, not only owner roles can be assigned to applications 14 accessing entries 12 of the directory 10. User roles can also be assigned to applications 14. The application 14 illustrated on the left-hand side of FIG. 3 has an owner role in relation to some alias entries 12$_A$ and has a user role in relation to the target entries 12$_T$ to which the alias entries 12$_A$ point. In contrast, the application 14 depicted on the right-hand side of FIG. 3 has a user role in relation to some target entries 12$_T$, but has no owner roles, since the application 14 directly accesses the target entries 12$_T$. A user role is a type of reserving right that an application 14 may have on a target entry 12$_T$.

FIG. 4 is a flow chart of one embodiment of the method of the invention, which may be carried out in the context of applications 14 and directories 10 as illustrated in FIG. 3. After an owner role is assigned s16 to an application 14 in relation to an alias entry 12$_A$ and after a user role is assigned s17 to an application 14 for a target entry 12$_T$, an application 14 may request s18$_{AT}$ the deletion of both an alias entry 12$_A$ and the associated target entry 12$_T$. It is then determined s20$_{AT}$ whether the application 14 is the only owner of the alias entry 12$_A$ and is the only user of the target entry 12$_T$. If so, in this embodiment, both the alias entry 12$_A$ and target entry 12$_A$ are deleted s22$_{AT}$.

The flow chart of FIG. 4 illustrates only one embodiment of the method. In other embodiments, the deletion condition may be different and, furthermore, an alias entry 12$_A$ may be deleted independently from the target entry 12$_T$ associated therewith. That is, the deletion of an alias entry 12$_A$ need not be carried out concurrently with the deletion of the associated target entry 12$_T$. This will become more fully apparent later in the description.

Figures 5A, 5B:
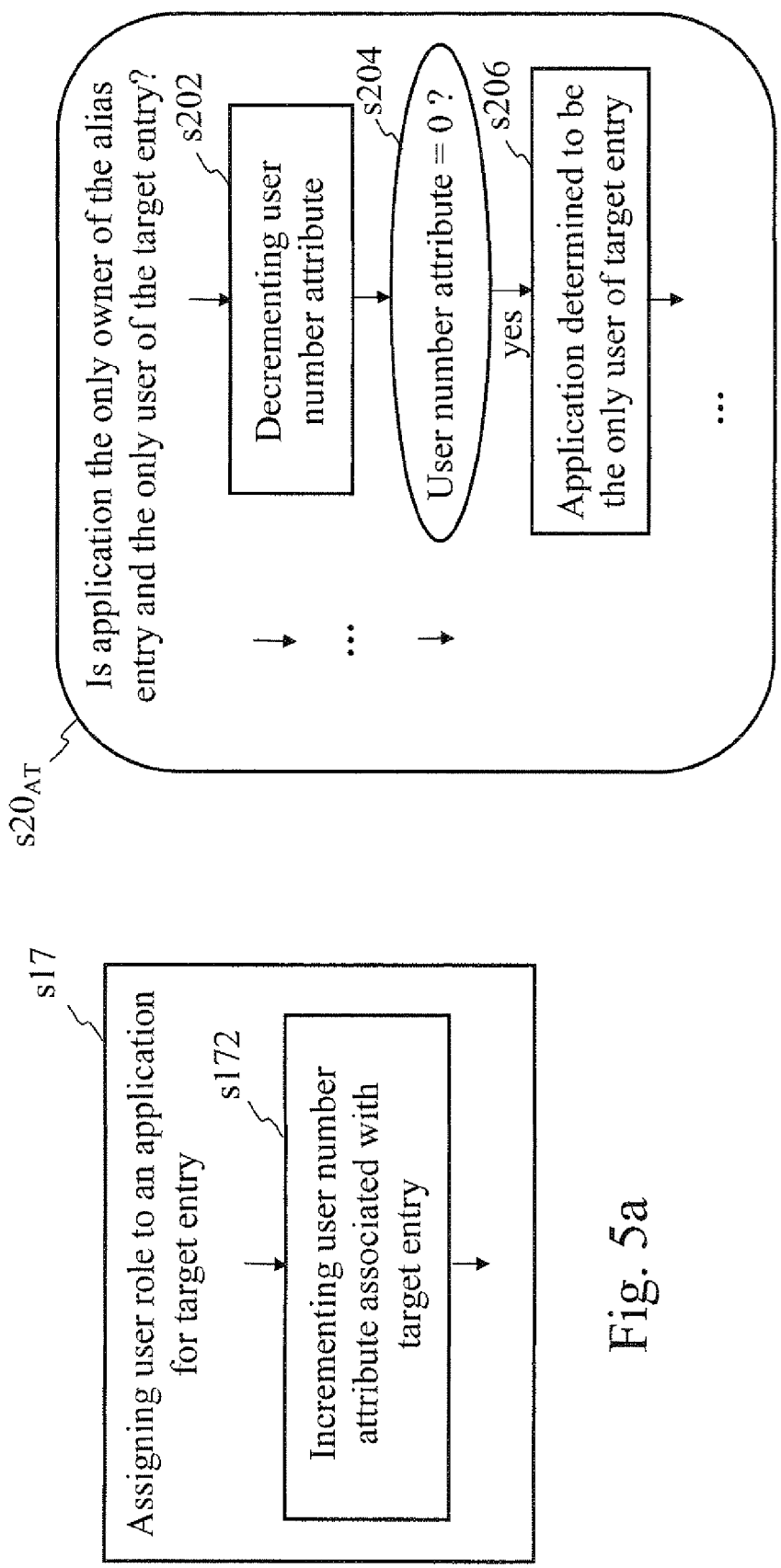
FIGS. 5a and 5b illustrate, in the form of flow charts, features of methods in embodiments of the invention.

FIG. 5a illustrates, in one embodiment, the implementation of the step of assigning s17 a user role to an application 14 in relation to a target entry 12$_T$. The assigning step s17 includes incrementing s172 a user number attribute associated with the target entry 12$_T$ (more generally, in an embodiment, the user number attribute is set to a next value, rather than being specifically incremented).

FIG. 5b illustrates, especially in the context of the embodiment illustrated in FIG. 5a, the implementation of the step of determining s20$_{AT}$ whether an application 14 is the only owner of an alias entry 12$_A$ and is the only user of a target entry 12$_T$. In FIG. 5b, determining whether the application 14 is the only owner of an alias entry 12$_A$ is not illustrated (as shown by the use of "..."), but can be understood in view of and in combination with the description of the other embodiments of the method of the invention. On the right-hand side of FIG. 5b, steps of determining whether an application 14 is the only user of a target entry 12$_T$ are illustrated. That is, a user number attribute is decremented s202 (more generally, in an embodiment, the user number attribute is set to a previous value, rather than being specifically decremented). If, as a result, the user number attribute is determined s204 to be equal to zero (more generally, in an embodiment, a reference value is used instead of zero), the application 14 is determined to be the only user of the target entry 12$_T$. Therefore, unless further sub-conditions are to be satisfied, the target entry 12$_T$ may be deleted.

In one embodiment, the user number attribute acting as a counter is replaced by a list of identifiers of the applications 14 having user roles in relation to a target entry 12$_T$. In other words, the use of a counter is optional.

Figures 6, 7:
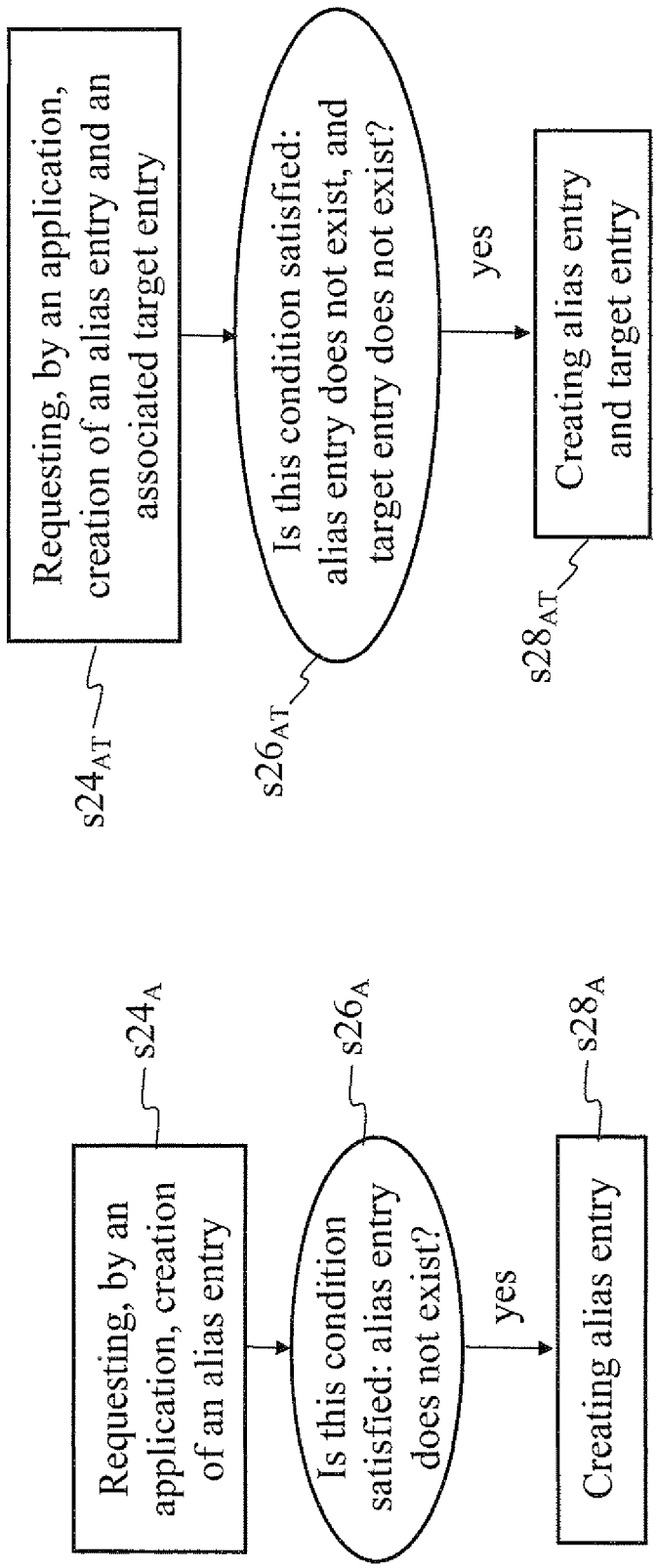
FIGS. 6 and 7 are flow charts showing steps leading to the creation of an alias entry (FIG. 6), and an alias entry and a target entry (FIG. 7), in methods of embodiments of the invention.

FIG. 6 is a flow chart illustrating steps leading to the creation of an alias entry 12$_A$ in one embodiment. When an application 14 requests s24$_A$ the creation of an alias entry 12$_A$, it is determined s26$_A$ whether the alias entry 12$_A$ to be created already exists. If it is determined s26$_A$ that the alias entry 12$_A$ does not exist yet, the creation s28$_A$ of the alias entry 12$_A$ may be allowed. At that stage, an owner role may be assigned s16 to the alias entry 12$_A$.

FIG. 7 is a flow chart illustrating steps relating to the handling of a request for creation of both an alias entry 12$_A$ and an associated target entry 12$_T$. When an application 14 requests s24$_{AT}$ the creation of an alias entry 12$_A$ and an associated target entry 12$_T$, it is determined s26$_{AT}$ if the following condition is satisfied: the alias entry 12$_A$ does not exist and the target entry 12$_T$ does not exist. If the condition is satisfied, the alias entry 12$_A$ and target entry 12$_T$ may be created s28$_{AT}$.

The embodiment illustrated in FIG. 7 is only one embodiment of the invention. In another embodiment, a request s24$_{AT}$ for creation of both an alias entry 12$_A$ and an associated target entry 12$_T$ may lead to determining that the alias entry 12$_A$ does not exist yet while the target entry 12$_T$ already exists. In this case, the method may lead to the creation of a new alias entry 12$_A$ pointing to the existing target entry 12$_T$. The application 14 may in this case be assigned an owner role in relation to the newly created alias entry 12$_A$ and a user role in relation to the existing target entry 12$_T$. This may imply incrementing the user number attribute.

Figure 8:
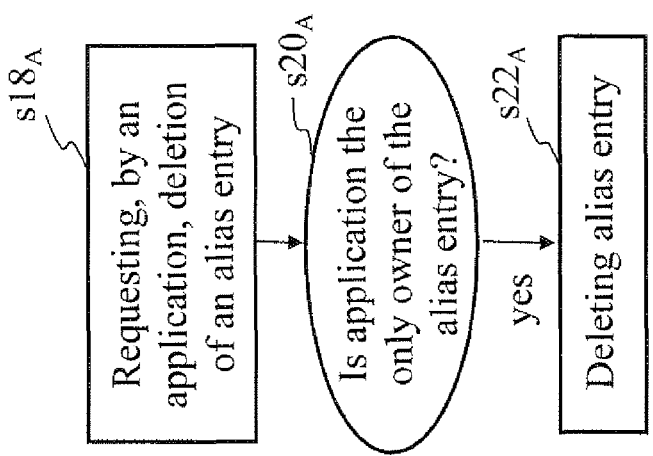
FIG. 8 is a flow chart of a portion of a method in one embodiment of the invention.

FIG. 8 is a flow chart illustrating steps, in one embodiment, for handling a request, by an application 14, for deletion of an alias entry 12$_A$. When an application 14 requests s18$_A$ the deletion of an alias entry 12$_A$, it is determined whether the application 14 is the only owner of the alias entry 12$_A$ requested to be deleted. This applies to the case wherein an alias entry 12$_A$ may be owned by more than one application 14. This is the case of a shared alias entry 12$_A$. If it is determined s20$_A$ that the application 14 is the only owner of the alias entry 12$_A$, the alias entry 12$_A$ may be deleted s22$_A$. This ensures that the alias entry 12$_A$ is not deleted if still owned by some applications 14.

Figure 9B:
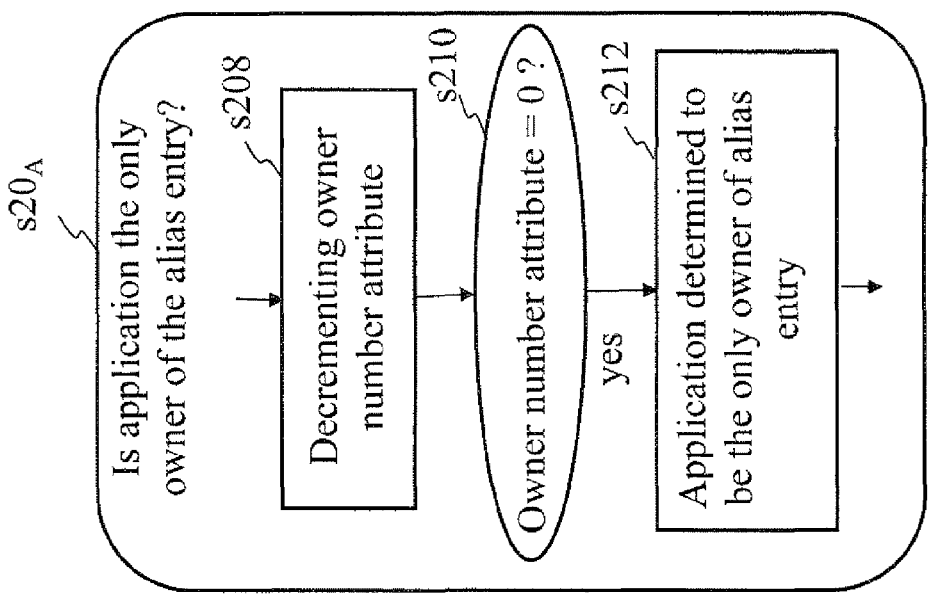
FIGS. 9a and 9b illustrate, in the form of flow charts, details of a method in one embodiment of the invention.
Figure 9A:
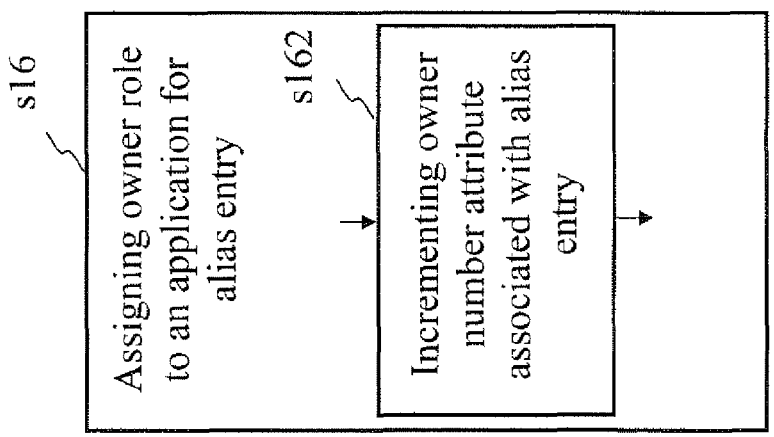

FIG. 9a illustrates, in the form of a flow chart, details of the step s16 of assigning an owner role to an application 14 in relation to an alias entry 12$_A$ in one embodiment. The step of assigning s16 includes incrementing s162 an owner number attribute associated with the alias entry 12$_A$ (more generally, in an embodiment, the owner number attribute is set to a next value, rather than being specifically incremented). The owner number attribute acts as a counter.

FIG. 9b is a flow chart illustrating steps, in one embodiment, the implementation of determining s20$_A$ whether an application 14 is the only owner of an alias entry 12$_A$. An owner number attribute, or the owner number attribute mentioned in relation to FIG. 9a, is decremented s208 (more generally, in an embodiment, the owner number attribute is set to a previous value, rather than being specifically decremented). If, as a result, the owner number attribute is determined s210 to be equal to zero (more generally, in an embodiment, a reference value is used instead of zero), then the application 14 is determined s212 to be the only owner of the alias entry 12$_A$.

Figure 10A:
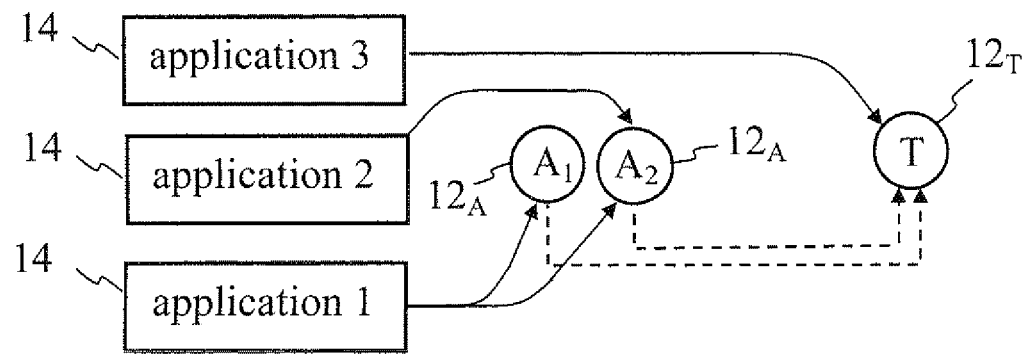
FIGS. 10a to 10c illustrate an example of carrying out a method in one embodiment of the invention.

FIG. 10a illustrates an example of a target entry $12_T$ to which more than one alias entry $12_A$ point. In particular, two alias entries $12_A$, labelled "$A_1$" and "$A_2$" respectively, point to the same target entry $12_T$. The target entry $12_T$ may be said to be indexed twice, i.e. multi-indexed.

Figures 11, 12:
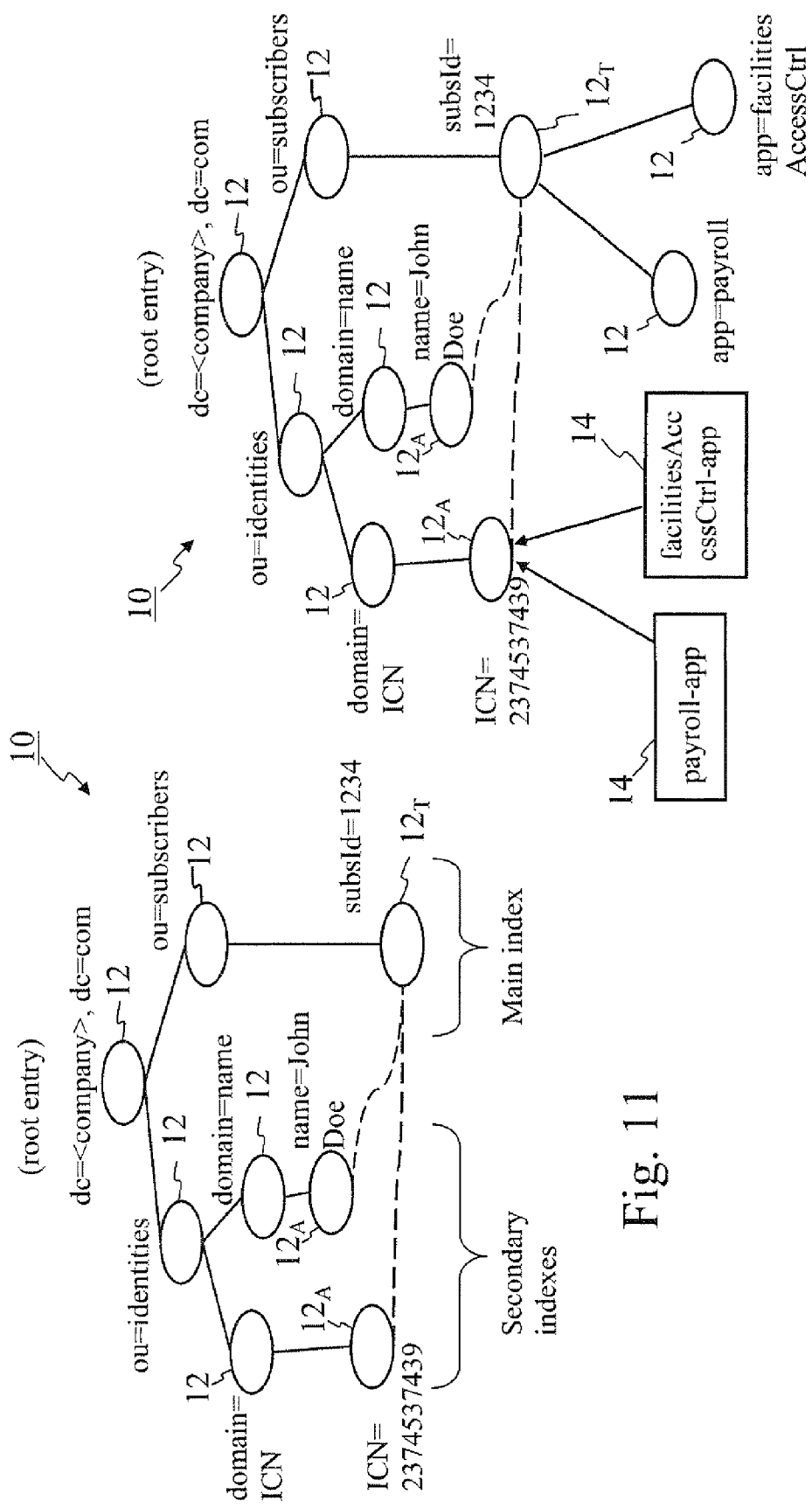
FIG. 11 schematically illustrates a directory having a target entry to which more than one alias entry point in one embodiment of the invention.
FIG. 12 illustrates an example of a shared alias entry in one embodiment of the invention.

Another example of a target entry $12_T$ to which more than one alias entry $12_A$ points is schematically illustrated in FIG. 11, in the context of an LDAP directory 10 or directory tree. LDAP presents information in the form of a hierarchical tree structure called a DIT (Directory Information Tree), in which the information, called entries 12 (or DSE, Directory Service Entry), is represented in branches. A branch located at the root of a branch is called the root entry. Each entry 12 in the LDAP directory relates to an object, unit or aggregate of information. Each entry 12 is made up of a collection of key/value pairs called attributes. In LDAP, a special type of attribute, called "alias attribute", is pointing to a specific entry 12 in the DIT. A target entry $12_T$ can be accessed via its direct domain name (dn) (main index), that is following the branches from the top of the tree, or by any alias entries $12_A$ pointing to the target entry $12_T$ (secondary indexes). The target entry "subsId" $12_T$ can be accessed using its dn, that is, following the branches from the top of the tree, through "ou=subscribers" and to "subsId=1234", but it can also be accessed by two other ways:
  following the branches from the top through the ICN domain entry 12 and to the "ICN=2374537439" alias entry $12_A$ (wherein ICN stands for identity card number); or
  following the branches from the top through the name domain entry 12 and to the "name=John Doe" alias entry $12_A$.

This means that, if the subscriber ID "subsID=1234" of the target entry $12_T$ where data for a subscriber is located is not known, but if its name "John Doe" or ICN "2374537439" is known, the subscriber data can nevertheless be accessed. The target entry $12_T$ identified by "subsId=1234" is said to be multi-indexed.

FIG. 10a also illustrates an example of shared alias entry $12_A$, i.e. an alias entry $12_A$ owned by two applications 14. The alias entry $12_A$ can be accessed by two applications 14. In particular, the alias entry $12_A$ labelled "$A_2$" is owned by two applications 14, labelled "application 1" and "application 2" respectively.

Another example of shared alias entry $12_A$ is illustrated in FIG. 12, in the specific and non-limiting context of an LDAP directory 10. Namely, the data of the "subsId=1234" target entry $12_T$ is being accessed by two different applications 14 that both use the "ICN" as identifier, i.e. that both use the "ICN" alias entry $12_A$. The facilities access control application 14 (labelled "facilitiesAccessCtrl-app") and the payroll application 14 (labelled "payroll-app") have specific data placed in the "subsId" target entry $12_T$ either in the same level or in some sub-entries. In this case, the same alias entry $12_A$ is used by two different applications 14 accessing different data centralized at or under same target entry $12_T$. This is a shared alias entry $12_A$.

Figure 10B:
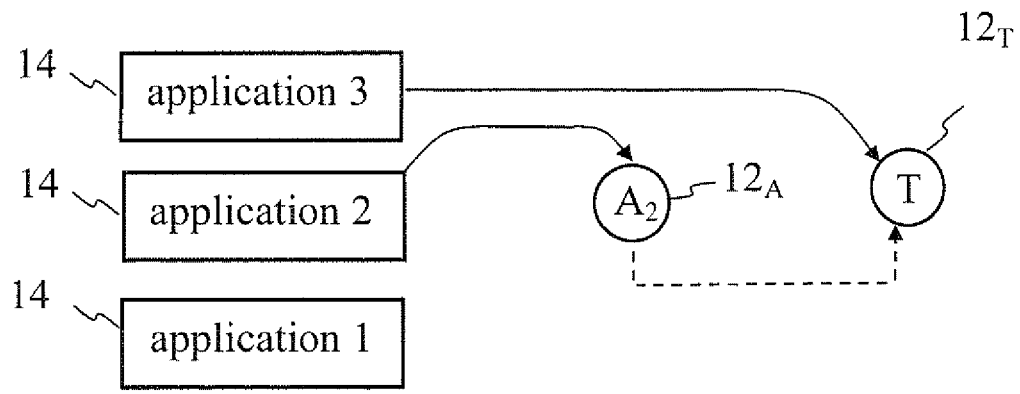
Figure 10C:
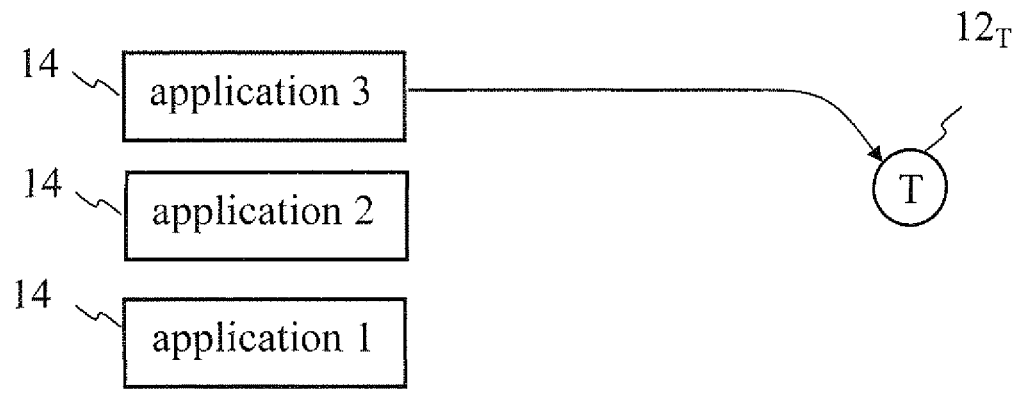

Returning to FIG. 10a, an example of application of one embodiment of the invention is described, in combination with FIGS. 10b and 10c.

In FIG. 10a, three applications 14 are illustrated, namely, application 1, application 2 and application 3. Application 1 accesses, or is capable of accessing, the target entry $12_T$ through two alias entries $12_A$, labelled "$A_1$" and "$A_2$" respectively. Application 1 is owner of the two alias entries "$A_1$" and "$A_2$". Application 2 accesses, or is capable of accessing, the target entry $12_T$ through the alias entry "$A_2$". Application 2 is owner of the alias entry "$A_2$". Application 3 directly accesses the target entry $12_T$.

Thus, in the exemplary state illustrated in FIG. 10a, the owner number attribute associated with alias entry "$A_1$" is equal to one since application 1 is owner of said alias entry. The owner number attribute associated with alias entry "$A_2$" is equal to two since both application 1 and application 2 are owner of said alias entry. The user number attribute associated with the target entry $12_T$ is equal to four because there are four ways of accessing the target entry $12_T$, namely directly from application 3, from application 2 through alias entry "$A_2$", from the application 1 through alias entry "$A_2$", and from application 1 through alias entry "$A_1$".

When application 1 terminates or decides to stop accessing the target entry $12_T$ (as illustrated in FIG. 10b), it may wish to delete the target entry $12_T$ and two alias entries "$A_1$" and "$A_2$" through which it accesses the target entry $12_T$. When requesting through the alias entry "$A_1$" the deletion of alias entry "$A_1$" and the target entry $12_T$, the user number attribute associated with alias entry "$A_1$" is decremented, becomes equal to zero, and alias entry "$A_1$" may then be deleted. The user number attribute associated with the target entry $12_T$ is decremented, becomes equal to three, and the target entry $12_T$ cannot therefore be deleted.

When application 1 then requests through alias entry "$A_2$" the deletion of alias entry "$A_2$" and the associated target entry $12_T$, the owner number attribute associated with alias entry "$A_2$" is decremented, becomes equal to one, and alias entry "$A_2$" cannot be deleted. The user number attribute associated with the target entry $12_T$ is decremented, becomes equal to two, and the target entry $12_T$ cannot therefore be deleted.

Then, now turning to FIG. 10c, when application 2 requests, through alias entry "$A_2$" the deletion of both alias entry "$A_2$" and the associated target entry $12_T$, the owner number attribute associated with alias entry "$A_2$" is decremented, becomes equal to zero, and alias entry "$A_2$" is therefore deleted. The user number attribute associated with the target entry $12_T$ is also decremented, becomes equal to one, and the target entry $12_T$ cannot therefore be deleted.

At that stage, if application 3 requests the deletion of the target entry $12_T$, the user number attribute is decremented, becomes equal to zero, and the target entry $12_T$ can be deleted. The owner number attribute and user number attribute which are maintained (for instance by a controller, which will be described later) ensures that the access integrity to the content of the target entry $12_T$ is safeguarded. This is carried out with simple and efficient signalling.

Figure 13A:
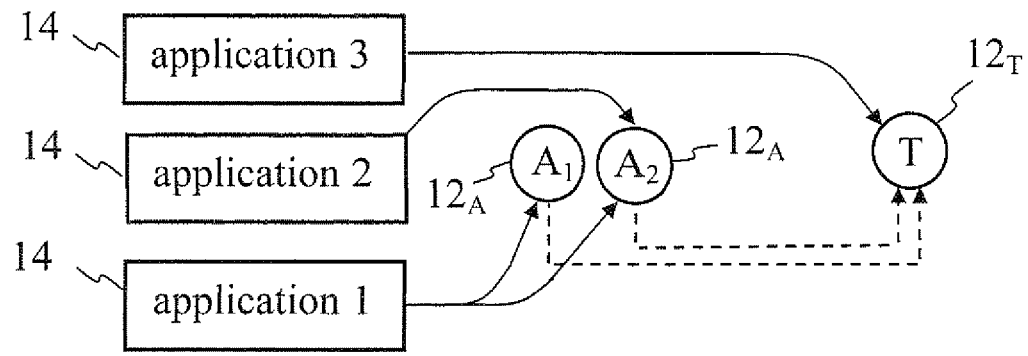
FIGS. 13a to 13c illustrate an example of carrying out a method in one embodiment of the invention.
Figure 13B:
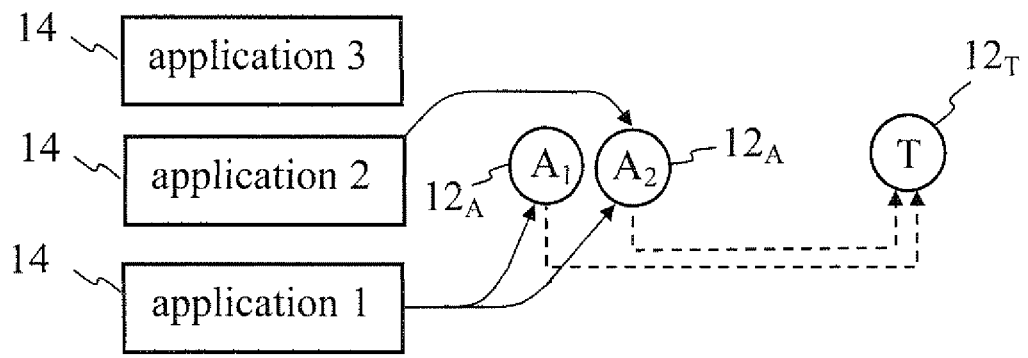
Figure 13C:
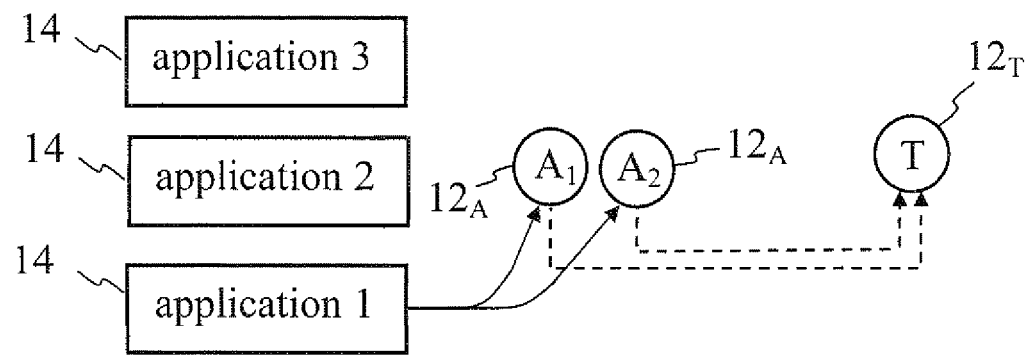

FIGS. 13a to 13c illustrate another example of application of an embodiment of the invention.

In the state illustrated in FIG. 13a, as explained with reference to FIG. 10a, the user number attribute associated with the target entry $12_T$ is equal to four, the owner number attribute associated with alias entry "$A_1$" is equal to one and the owner number attribute associated with alias entry "$A_2$" is equal to two. When application 3 terminates or wishes to delete target entry $12_T$, it sends a request for deletion of the target entry $12_T$. The user number attribute associated with the target entry $12_T$ is decremented, becomes equal to three, and the target entry $12_T$ cannot therefore be deleted. This state is illustrated in FIG. 13b.

Now turning to FIG. 13c, application 2 sends a request for deletion of both alias entry "$A_2$" and the target entry $12_T$. The owner number attribute associated with alias entry "$A_2$" is decremented, becomes equal to one, and alias entry "$A_2$" cannot therefore be deleted. The user number attribute associated with the target entry $12_T$ is also decremented, becomes equal to two, and the target entry $12_T$ cannot be deleted.

Then, if at that stage application 1 sends a request for deletion of alias entry "$A_1$" and target entry $12_T$, through alias entry "$A_1$", the owner number attribute associated with alias entry "$A_1$" is decremented, becomes equal to zero, and alias entry "$A_1$" can be deleted. The user number attribute associated with the target entry $12_T$ is decremented, becomes equal to one, and the target entry $12_T$ cannot be deleted. At that stage (not illustrated), if application 1 sends, through alias entry "$A_2$", a request for deletion of both alias entry "$A_2$" and the target entry $12_T$, the owner number attribute associated with alias entry "$A_2$" is decremented, becomes equal to zero, and alias entry "$A_2$" is therefore deleted. The user number attribute associated with target entry $12_T$ is decremented, becomes equal to zero and the target entry $12_T$ can therefore be safely deleted.

FIGS. 10a to 10c and 13a to 13c illustrate two examples of application of embodiments of the invention. Other examples of application of the invention may be contemplated depending on the circumstances and succession of deletion requests, based on the same mechanisms.

Figure 14:
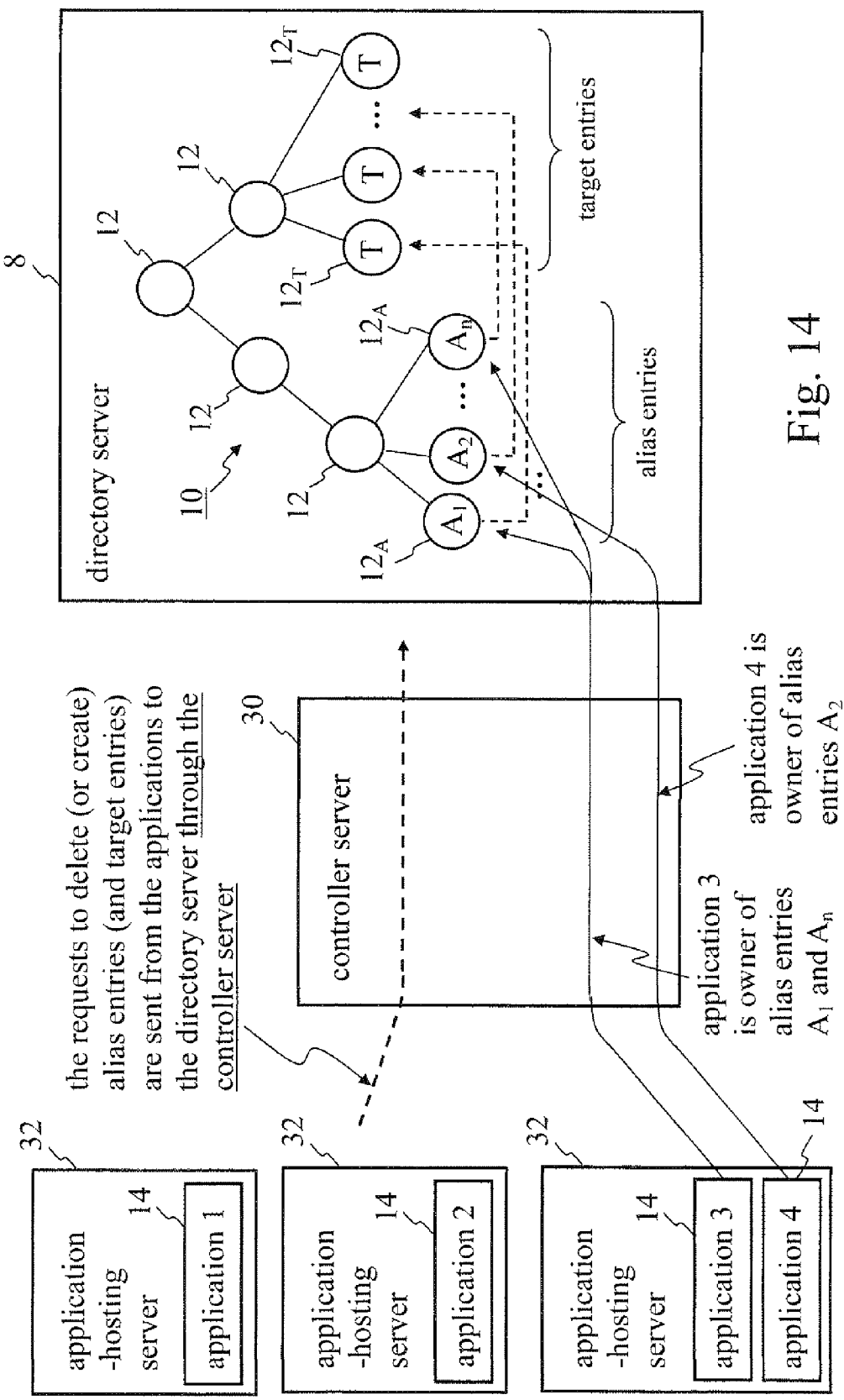
FIG. 14 schematically illustrates a system in one embodiment of the invention.

FIG. 14 schematically illustrates a system in one embodiment of the invention. Three application-hosting servers 32, each hosting one or more applications 14, access through a control server 30 hosting a controller, the entries 12 of a directory 10 hosted on a directory server 8. Applications 14 can request the creation and/or deletion of entries 12 and can access the content of the target entries $12_T$ for any purpose (reading, updating, etc). The directory 10 is the data storage. The controller server 30 hosting the controller 30, also called controller function, handles the requests. The controller 30 may also be in charge of ensuring the transactionality of the operations.

The controller 30 executes procedures in order to properly handle requests. Requests such as "Remove owner from alias entry", "Delete alias entry", "Delete target entry", and "Remove user from target entry" are executed notably depending on the application's owner and user role in relation to the respective target entries $12_T$ and alias entries $12_A$, and depending on the owner number attributes and user number attributes associated with the alias entries $12_A$ and target entries $12_T$ respectively.

The controller's 30 interface may allow request messages, such as in one embodiment:
  A create request, containing four attributes, the alias entry name (mandatory), the target entry name (mandatory), owner identifier (mandatory), and additional target entry values (optional).
  A delete request, containing three attributes, owner identifier (mandatory), a list of alias entry names (optional) and the target entry name (optional). One of them or both of them are present.

If a create request is received by the controller 30, the controller 30 determines whether the target entry $12_T$ (i.e., more precisely, a target entry $12_T$ with the target entry name mentioned in the create request) already exists. If the target entry $12_T$ does not exist yet, the target entry $12_T$ is created and the alias entry $12_A$ is created as well. If the target entry $12_T$ already exists, a user role is added in relation to the target entry $12_T$ and, then, the controller 30 determines whether the alias entry $12_A$ (i.e., more precisely, an alias entry $12_A$ with the alias entry name mentioned in the create action request) already exists. If the alias entry $12_A$ already exists, an owner role is added in relation to the alias entry $12_A$. If the alias entry $12_A$ does not already exist, the alias entry $12_A$ is created.

If a deletion request (of an alias entry $12_A$ and target entry $12_T$) is received by the controller 30, the controller 30 determines whether the application 14 from which the request originates has an owner role in relation to the alias entry $12_A$. If the application 14 has no owner role in relation to the alias entry $12_A$, further handling of the deletion request is refused. That is, actual deletion does not take place. The application 14 may be informed thereof. If the application 14 has an owner role in relation to the alias entry $12_A$, the controller 30 determines whether the alias entry $12_A$ has any other owner. If the alias entry $12_A$ has at least one other owner, the owner role of the requesting application 14 in relation to the alias entry $12_A$ is removed.

If the alias entry $12_A$ has no other owner, the alias entry $12_A$ is deleted and the controller 30 determines whether the target entry $12_T$ (to which the alias entry $12_A$ points) has any other user. If the target entry $12_T$ has at least one other user, the user role of the requesting application 14 in relation to the target entry $12_T$ is removed. If the target entry $12_T$ has no other user, the target entry $12_T$ is removed.

The controller 30 may be deployed in different forms:
  Standalone, deployed in a hardware entity being different from the application 14 and the directory 10. The controller 30 and the directory 10 interfaces are external (i.e. accessible to other hardware entities).
  Application-hosting servers 32 host the controller 30 or controller function. The controller 30 interface is internal (i.e. accessible within the application-hosting server 32) and the directory interface is external (i.e. accessible to other hardware entities).
  Directory 10 hosts the controller 30 or controller function. The controller 30 interface is external (i.e. accessible to other hardware entities) and the directory interface is internal (i.e. accessible with the directory server 8).

The handling of requests for creation and deletion is further illustrated in FIGS. 15 to 17, in embodiments of the invention.

A creation of new target entry $12_T$ and new alias entry $12_A$, in one embodiment, is described with reference to FIG. 15 as follows. An application 14 prepares a creation request and sends it to a controller 30 with the alias entry name, the target entry name, and optionally additional target entry values ("Create request ( . . . )"). The read process is then executed ("Read info"). The target entry $12_T$ and alias entry $12_A$ information is read from the directory 10 ("Read request"). Since the target entry $12_T$ does not exist, it is created with an indication of the user ("Target entry handling"). The target entry $12_T$ is created using a suitable message ("Write request"). Since the alias entry $12_A$ does not exist, it is also created with the indication of the owner ("Alias entry handling"). The alias entry $12_A$ is created using a suitable message ("Write request"). A response is then sent to the application 14 ("Create response").

An addition of a new alias entry $12_A$ pointing to an existing target entry $12_T$, in one embodiment, is also described with reference to FIG. 15 as follows. An application 14 prepares a creation request and sends it to the controller 30 with the alias entry name and the target entry name ("Create request ( . . . )"). The read process is executed ("Read info"). The target entry and alias entry information is read from the directory 10 ("Read request"). Since the target entry $12_T$ already exists, a new user of the target entry $12_T$ is added ("Target entry handling"). The target entry $12_T$ is updated using a suitable message ("Write request"). Since the alias entry $12_A$ does not exist, it is created with the indication of the owner ("Alias entry handling"). The alias entry $12_A$ is created using a suitable message ("Write request"). A response is then sent to the application 14 ("Create response").

An addition of an owner to an existing alias entry $12_A$, in one embodiment, is further described with reference to FIG. 15 as follows. An application 14 prepares a creation request and sends it to the controller 30 with the alias entry name and the target entry name ("Create request ( . . . )"). The read process is executed ("Read info"). The target entry and alias entry information is read from the directory 10 ("Read request"). Since the target entry $12_T$ already exists, a new user of the target entry $12_T$ is added ("Target entry handling"). The target entry $12_T$ is updated using a suitable message ("Write request"). Since the alias entry $12_A$ already exists, a new owner is added to the alias entry $12_A$ ("Alias entry handling"). The alias entry $12_A$ is updated using a suitable message ("Write request"). A response is then sent to the application 14 ("Create response").

A deletion of an alias entry $12_A$, in one embodiment, is described with reference to FIG. 16 as follows. An application 14 prepares a delete request and sends it to a controller 30 with the alias entry name and the target entry name ("Delete request ( . . . )"). The read process is executed ("Read info"). The target entry and alias entry information is read from the directory 10 ("Read request"). Since the alias entry $12_A$ has more than one owner, the owner list is updated by removing the owner concerned ("Alias entry handling"). The alias entry $12_A$ is updated using a suitable message ("Write request"). A response is then sent to the application 14 ("Delete response"). In this embodiment, the removal of a user role associated with the target entry $12_T$ is also required (although not illustrated in FIG. 16). In another embodiment, the user roles may however be assigned to alias entries, not to applications 14. In that embodiment, removal of a user role associated with the target entry $12_T$ would not be required in the scenario of FIG. 16.

A deletion of an alias entry $12_A$, in one embodiment, is also described with reference to FIG. 17 as follows. An application 14 prepares a delete request and sends it to a controller 30 with the alias entry name and the target entry name ("Delete request ( . . . )"). The read process is executed ("Read info"). The target entry and alias entry information is read from the directory 10 ("Read request"). Since the alias entry $12_A$ has no more owners, the alias entry $12_A$ is removed ("Alias entry handling"). The alias entry $12_A$ is deleted using a suitable message ("Write request"). Since the alias entry $12_A$ has been deleted, the user list associated with the target entry $12_T$ is updated ("Target entry handling"). The target entry's user list is updated using a suitable message ("Write request"). A response is then sent to the application 14 ("Delete response").

A deletion of an alias entry $12_A$ and a target entry $12_T$, in one embodiment, is also described with reference to FIG. 17 as follows. An application 14 prepares a delete request and sends it to a controller 30 with the alias entry name and the target entry name ("Delete request ( . . . )"). The read process is executed ("Read info"). The target entry and alias entry information is read from the directory 10 ("Read request"). Since the alias entry $12_A$ has no more owners, the alias entry $12_A$ is removed ("Alias entry handling"). The alias entry $12_A$ is deleted with a suitable message ("Write request"). Since the last user associated with the target entry $12_T$ has been removed, the target entry $12_T$ is deleted too ("Target entry handling"). The target entry $12_T$ is deleted using a suitable message ("Write request"). A response is then sent to the application 14 ("Delete response").

Figure 18:
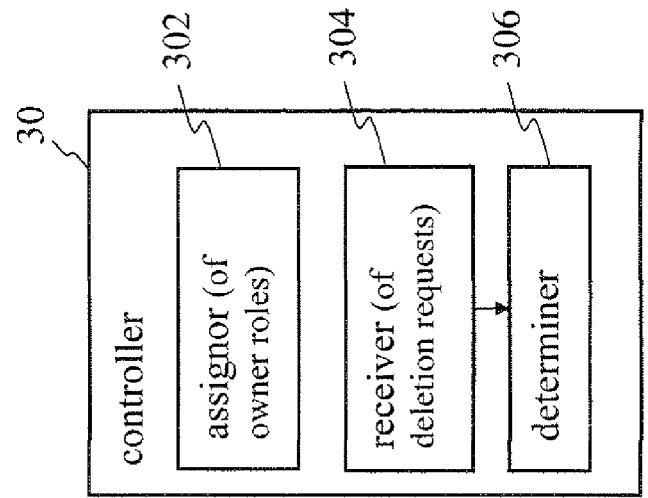

FIG. 18 schematically illustrates a controller 30 for managing a directory 10. The controller 30 includes an assigner 302 configured for assigning to an application 14 an owner role in relation to an alias entry $12_A$. The controller 30 also includes a receiver 304 configured for receiving requests, from an application 14, for deletion of an alias entry $12_A$. When such a request is received, a determiner 306 is used for determining if a deletion condition is satisfied. If the deletion condition is satisfied, the alias entry $12_A$ is deleted. The deletion condition includes that the application 14 is the only owner of the alias entry $12_A$.

The controller 30 acts as an intermediate component to manage requests for deletion of alias entries $12_A$ of a directory 10 received from applications 14.

Figure 19:
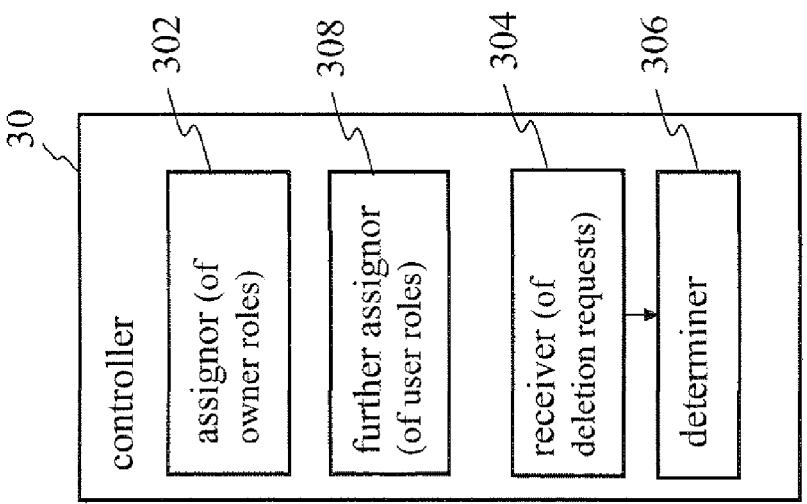

A controller 30 in another embodiment of the invention is schematically illustrated in FIG. 19. In addition to the assignor 302, the receiver 304 and the determiner 306 described with reference to FIG. 18, the controller 30 includes a further assigner 308 which is configured for assigning to an application 14 a user role in relation to a target entry $12_T$. When a deletion request is received from an application 14 by the receiver 304 and when this deletion request is for deleting not only an alias entry $12_A$ but also the target entry $12_T$ to which the alias entry $12_A$ points, the determiner 306 is also used to handle the request, but the deletion condition further includes that the application 14 is the only user of the target entry $12_T$.

Figure 20:
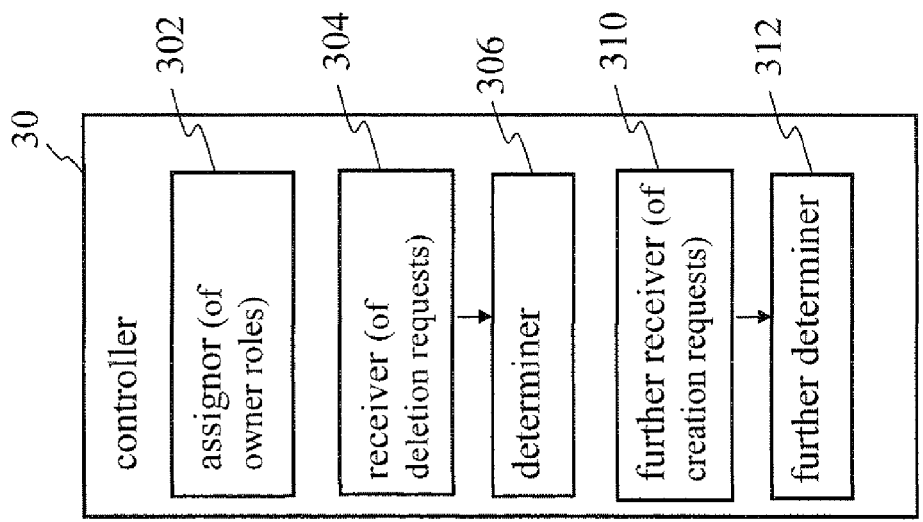
FIGS. 18 to 20 schematically illustrate controllers in embodiments of the invention.

FIG. 20 schematically illustrates a controller 30 in a further embodiment of the invention. The controller 30 includes an assignor 302, a receiver 304 and a determiner 306, as described with reference to FIG. 18. It includes in addition a further receiver 310 configured for receiving a creation request, from an application 14, to create an alias entry $12_A$ associated with a target entry $12_T$. A further determiner 312 is then configured for determining if a creation condition is satisfied. If the creation condition is satisfied, the alias entry $12_A$ is created. The creation condition includes that the alias entry $12_A$ does not exist yet.

The embodiments of the controller 30 described with reference to FIGS. 19 and 20 may be combined to form other embodiments.

Figure 21:
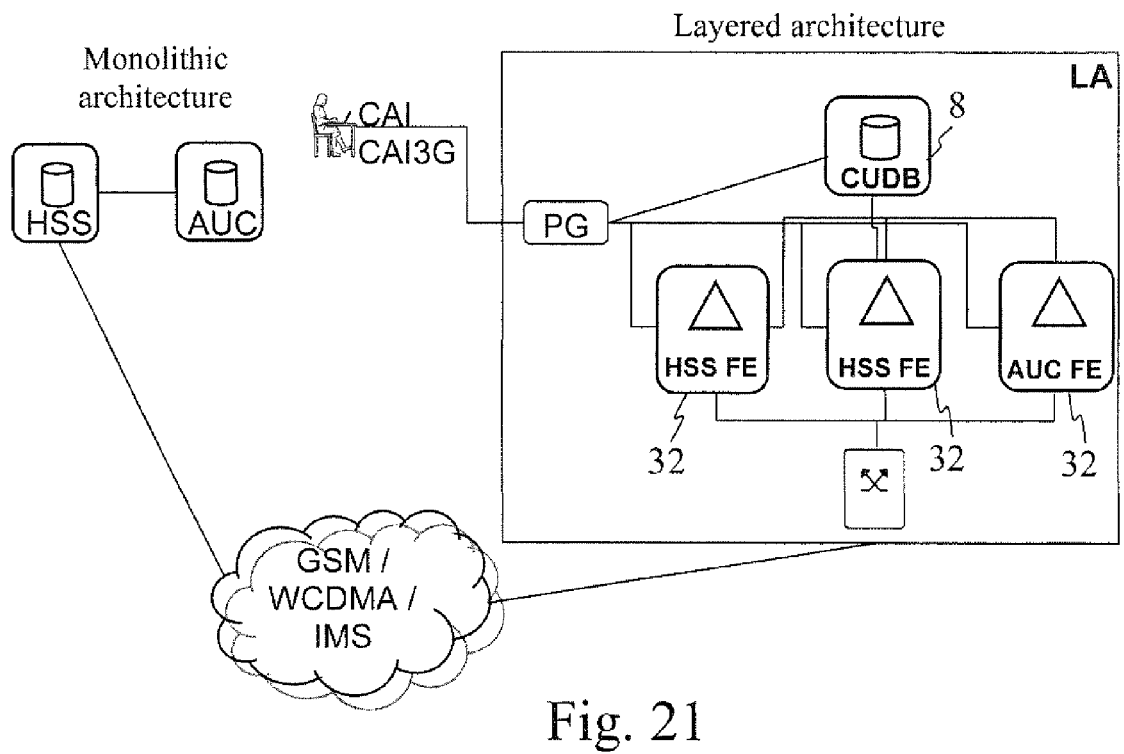
FIG. 21 schematically illustrates a layered architecture (LA) to which embodiments of the invention may apply.

Embodiments of the invention also apply to a home subscriber server (HSS) implemented using a distributed system, such as a distributed layered architecture (DLA). In such an architecture, which is illustrated in FIG. 21, there is a separation of the application logic and the subscriber data in different physical network elements, namely front ends and directory database, so that front ends generally do not store data. For example, this may result from the evolution of HSS or authentication center (AUC) monolithic nodes (shown on the left-hand side of FIG. 21) towards a layered architecture (LA) (shown on the right-hand side of FIG. 21). Such architecture, in the context of a telecommunications core network, may include the following network nodes:

A common user database (CUDB) 8, which is the building block in the architecture and serves as a central storage point for HSS, AUC, MNP . . . subscriber data. It receives subscriber data search and update requests according to traffic, provisioning and services scenarios. The CUDB 8 can be implemented as a X.500 directory. It is a directory server 8 storing a directory 10.

HSS front end (FE 32), which is the building block in the layered architecture that implements the logic of the HSS application. The FE 32 does not include the subscriber database and it is also adapted to interface to the CUDB 8 that maintains the subscribers' profile.

AUC front end (FE 32), which is the building block in the layered architecture that implements the logic of the AUC application. The FE 32 does not include the subscriber database and it is also adapted to interface to the CUDB 8 that maintains the subscribers' profile.

Provisioning gateway (PG), which is the building block that implements the data access layer for data provisioning purposes.

Figure 22:
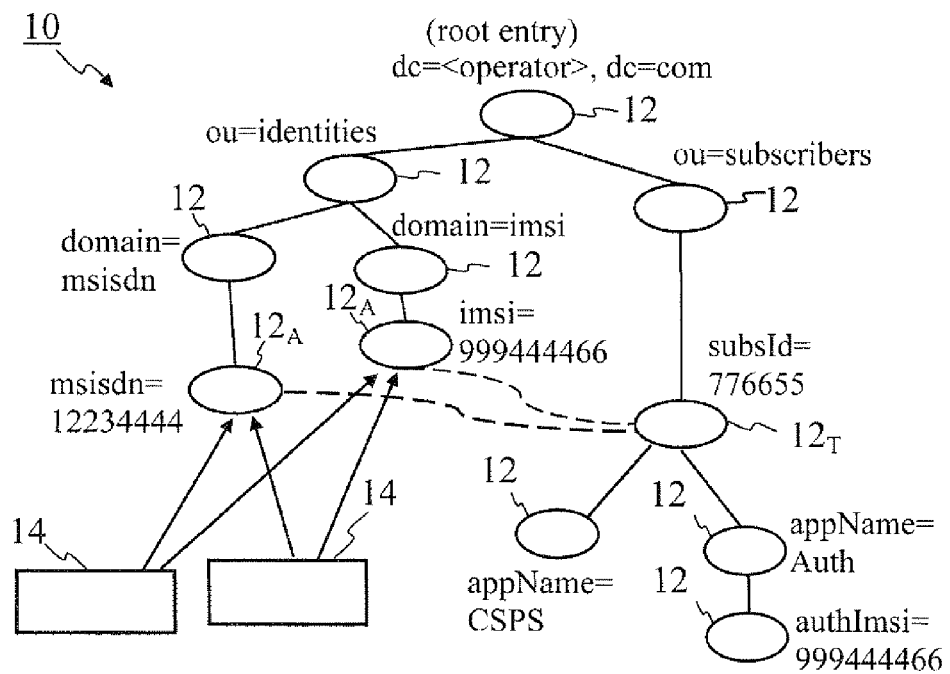
FIG. 22 schematically illustrates a directory usable in one embodiment of the invention, in a telecommunications context.

Each application 14, each hosted on an application-hosting server 32 (HSS front end or AUC front end), manages specific entries 12 in its sub-tree stored in the directory 10, labelled "CUDB" in FIG. 21, and shown in FIG. 22. The shared alias entries $12_A$ to access the specific application FE subscriber data are stored in the directory 10. For example in FIG. 22, the CSPS entry 12 used by the HSS FE application 14 may be accessed by subsid, imsi and msisdn entries 12 stored in the directory 10. Auth and authlmsi sub-entries 12 which are used by the AUC FE application 14 may be accessed by subsid and imsi entries 12 stored in directory 10.

The PG manages all the entries 12 belonging to all the applications 14.

The following description, with reference to FIG. 22, will help to understand in more details problems that embodiments of the inventions address and solve. The problems notably relate to the manner and order according to which the entries 12 are created and deleted. The problems which are solved occur, first, regarding multi-indexed target entries $12_T$ and, secondly, regarding shared alias entries $12_A$.

First, in the case of multi-indexed target entries $12_T$, the "subsId" target entry $12_T$ can be created in first place and then the alias entries $12_A$ in any order; or the other way around, first the alias entries $12_A$ (in any order) and then the "subsId" target entry $12_T$.

When deleting, if each entry 12 could be deleted independently of the others, the following errors could occur:

When deleting the "imsi" or "msisdn" alias entries $12_A$, the applications 14 using the deleted alias entries $12_A$ would fail when attempting to access the data in the "subsId" target entry $12_T$, although the data would still be available in the "subsId" target entry $12_T$ and accessible through the other alias entries $12_A$ as well as directly. Although there would not be an inconsistency, the management would be uncompleted.

When deleting all alias entries $12_A$ (the "imsi" and "msisdn" alias entries $12_A$ in the example), the applications 14 using the deleted alias entries $12_A$ would fail when accessing the data in the "subsId" target entry $12_T$, although the data would still be available in the "subsId" target entry $12_T$ and accessible directly. Although there would not be an inconsistency, the management would also be uncompleted.

When deleting the "subsId" target entry $12_T$ while keeping the alias entries $12_A$ without target entry, all applications 14 would fail when attempting to access the data. If all similar alias entries $12_A$ were not removed however, they would occupy room in the database memory, so wasting it. Although there would not be an inconsistency, the management would also be uncompleted.

Another problem addressed by the invention is that, if the alias entries $12_A$ could be deleted independently from the target entry $12_T$, the "subsId" target entry $12_T$ would need additional messages for being deleted, without the invention.

Also, without the invention, the creation and deletion of the alias entries $12_A$ and the "subsId" target entry $12_T$ could be not atomic and therefore more prone to errors.

Secondly, in the case of shared alias entries $12_A$, the "subsId" target entry $12_T$ can also be created in first place and then the alias entries $12_A$ can be created in any order; or the other way around, first the alias entries $12_A$ (in any order) and then the "subsId" target entry $12_T$. The application-specific sub-entries 12, CSPS, Auth, and so on, can also be created in any order, maintaining the parent-children hierarchy.

When deleting, if each entry 12 could be deleted independently of the others, the following errors could occur:

When removing authentication entries 12, the "authlmsi" and "auth" entries 12 would be removed first, then the "imsi" alias entry $12_A$. If the "imsi" alias entry $12_A$ was removed, since it is a shared alias entry $12_A$, any HSS request using the "imsi" alias entry $12_A$ would fail.

When removing HSS "CSPS" entry 12 first, then the "imsi" and "msisdn" alias entries $12_A$, if the "imsi" alias entry $12_A$ was deleted, any further operation on authentication using it would fail.

Thus, when handling deletion operations, controlling which application 14 is the latest owner of a shared alias entry $12_A$ assists to properly delete it.

An example of implementation of multiple alias entries $12_A$ in LDAP, notably regarding the formats that may be used, will now be described.

A procedure to handle multiple alias entries $12_A$ pointing to a target entry $12_T$ may be described as follows. An embodiment of the invention extends the LDAP (Zeilenga, K., "Lightweight Directory Access Protocol (LDAP): Technical Specification Road Map", RFC 4510, June 2006) to allow clients (applications 14) executing create and delete operations which applies to a target LDAP entry $12_T$, a list of LDAP alias entries, and a list of shared LDAP alias entries $12_A$ with the option of control the number of users of the shared alias entries $12_A$ and have them performed as one unit of interaction, an atomic transaction (for implementing LDAP transaction operation, see for instance Kurt D. Zeilenga, "LDAP Transactions <draft-zeilenga-ldap-txn-09.txt-", IETF, 22 Oct. 2006).

This extension consists of two extended operation request and two response messages ("extended" for instance in the sense of section "4.12 Extended Operation" of Sermersheim, J., "Lightweight Directory access protocol (LDAP): The Protocol", IETF, RFC 4511, June 2006). The "multiple alias entry add" operation request is used to create the target entry $12_T$ and the alias entries $12_A$. The "multiple alias entry delete" operation request is used to delete the target entry $12_T$ and the alias entries $12_A$, a control is made over the shared alias entries $12_A$ and the target entry $12_T$. Two attributes may be used:

Multi-indexCntr: Placed in the target entry $12_T$ to which the alias entries $12_A$ point. It counts the number of alias entries $12_A$ that point to the target entry $12_T$ and it may be updated in the course of the different alias entry creation or deletion operations. If its value is larger than zero, it means that a deletion request cannot be handled by any other standard LDAP operation. If the value becomes zero as a result of a delete operation, the target entry $12_T$ is deleted.

SharingCntr: Placed in each alias entry $12_A$ which points to any target entry $12_T$ to which more than two alias entries $12_A$ point. When set to 1, the attribute indicates that the alias entry $12_A$ is being used by an application 14 to point to the target entry $12_T$. That is, the target entry $12_T$ is being pointed as well by other alias entries $12_A$ used by the same or different applications 32. Besides, an alias entry $12_A$ may be shared by more than one application 14. When the counter value is larger than 1, the attribute indicates the number of applications 32 that use this alias entry $12_A$ pointing to a target entry $12_T$ to which more than two alias entries $12_A$ point.

These counters may be created by default to 0 if the entries 12 are created by standard operation. If so, it can be handled by standard operation.

Multiple alias entry add request and response may be described as follows in one embodiment of the invention. A "multiple alias entry add request" is an LDAP message of CHOICE extendedReq where the requestName may be assigned by Internet Assigned Numbers Authority (IANA) and the requestValue is present and contains a BER-encoded settlementValue.

The settlementValue is a structure that consists of condition and modification fields

```
settlementValue {
    aliasDNList,
    targetEntryDN}
```

(wherein DN stands for distinguished name).

The aliasDNList field contains the list of DN of alias entries $12_A$, and the targetEntryDN field contains the entry dereferenced by all alias entries $12_A$.

A "multiple alias entry add response" is an LDAP message sent in response to a "multiple alias entry add request". Its response name is present. The responseValue is not present.

Multiple alias entry delete request and response may be described as follows. A "multiple alias entry delete request" is an LDAP message of CHOICE extendedReq where the requestName may be assigned by IANA and the requestValue is present and contains a BER-encoded settlement Value.

The settlementValue is a structure that consists of condition and modification fields

```
settlementValue {
    aliasDNList,
    targetEntryDN}
```

The aliasDNList field contains the list of DN of multiple or shared alias entries $12_A$ and the targetEntryDN field contains the entry dereferenced by all alias entries $12_A$.

A "multiple alias entry delete response" is an LDAP message sent in response to a "multiple alias entry add request. Its response name is present. The responseValue is not present.

The aliasDNList element contains the information of the DN of the alias entries $12_A$ and may be defined as follows:

| aliasDNList | mandatory | It is a DN type. It contains the list of the DNs related to the multiple alias entries $12_A$ and shared alias entries $12_A$. |
|---|---|---|

The targetEntryDN element may be defined as follows:

| targetEntryDN | mandatory | It contains the DN of the target entry $12_T$, that is the entry dereferenced by all alias entries $12_A$. |
|---|---|---|

In one embodiment of the invention, the method further includes requesting $s24_A$, by an application 14, creation of an alias entry $12_A$ of a target entry $12_T$; and, determining $s26_A$ if a condition, here referred to as creation condition, is satisfied, and, if so, creating $s28_A$ the alias entry $19_A$ wherein the creation condition includes that the alias entry $12_A$ does not exist.

In a sub-embodiment of this embodiment, the method is such that requesting $s24_{AT}$, by an application 14, creation of an alias entry $12_A$ of a target entry $12_T$ further includes requesting creation of the target entry $12_T$ to which the alias entry $12_A$ points; if the creation condition is determined $s26_{AT}$ to be satisfied, creating $s28_{AT}$ further includes creating the target entry $12_T$; and the creation condition further includes that the target entry does not exist.

In one embodiment of the invention, the method is such that the directory 10 is any one of a lightweight directory access protocol (LDAP) directory and a X.500 directory.

In one embodiment of the invention, the controller 30 further includes a further receiver 310 configured for receiving a request, from an application 14, to create an alias entry $12_A$ of a target entry $12_T$; and a further determiner 312 configured for determining if a condition, here referred to as creation condition, is satisfied, and, if so, creating the alias entry $12_A$, wherein the creation condition includes that the alias entry $12_A$ does not exist.

In a sub-embodiment of this embodiment, the controller 30 is such that the request that the further receiver 310 is configured for receiving is additionally a request to create the target entry $12_T$ to which the alias entry $12_A$ points; the further determiner 312 is further configured for determining if the creation condition is satisfied, and, if so, creating the target entry $12_T$; and the creation condition further includes that the target entry $12_T$ does not exist.

In one embodiment of the invention, the server 8 is such that the directory 10 is any one of a lightweight directory access protocol (LDAP) directory and a X.500 directory.

The physical entities according to embodiments of the invention, including the application-hosting server 32, the controller server 30 and the directory server 8 may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "controller", "application", "directory", "assignor", "receiver", "determiner", "further assignor", "further receiver" and "further determiner" are used herewith, no restriction is made regarding how distributed these elements may be and regarding how gathered elements may be. That is, the constituent sub-elements of an element may be distributed in different software or hardware components or devices for bringing about the intended function. A plurality of distinct elements may also be gathered for providing the intended functionalities.

Any one of the above controller, application, directory, assignor, receiver, determiner, further assignor, further receiver and further determiner (and the like) may be implemented in hardware, software, field-programmable gate array (FPGA), application-specific integrated circuit (ASICs), firmware or the like.

In further embodiments of the invention, any one of the above-mentioned and/or claimed controller, application, directory, assignor, receiver, determiner, further assignor, further receiver and further determiner is replaced by controlling means, application means, directory means, assigning means, receiving means, determining means, further assigning means, further receiving means and further determining means respectively, or by a controlling unit, application unit, a directory unit, an assigning unit, a receiving unit, a determining unit, a further assigning unit, a further receiving unit and a further determining unit respectively, for performing the functions of the controller, application, directory, assignor, receiver, determiner, further assignor, further receiver and further determiner.

In further embodiments of the invention, any one of the above-described and/or claimed steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method for managing a directory stored on at least one server, wherein
    the directory includes a plurality of entries arranged in a tree structure, each entry including at least one attribute;
    the directory is configured so that a first entry can include an attribute pointing to a second entry, here referred to as target entry, the first entry being then here referred to as alias entry of the target entry; and
    the method includes
        assigning to an application an owner role in relation to an alias entry, an application to which an owner role is assigned in relation to an alias entry being here referred to as owner of the alias entry, and wherein each alias entry can belong to one or more owner applications;
        requesting, by an application which is either owner of the alias entry or not, deletion of the alias entry; and
        determining if a condition, here referred to as deletion condition, is satisfied, and, if so,
        when the deletion condition includes that the application is the only owner of the alias entry, deleting the alias entry; and
        when the deletion condition includes that the application is not the only owner of the alias entry, releasing the owner role for the application in relation to the alias entry.

2. The method of claim 1, further including
    assigning to an application a user role in relation to a target entry, an application to which a user role is assigned in relation to a target entry being here referred to as user of the target entry; wherein
    requesting deletion of the alias entry further includes requesting deletion of the target entry to which the alias entry points;
    if, in the determining step, the deletion condition is determined to be satisfied, deleting further includes deleting the target entry; and
    the deletion condition further includes that the application is the only user of the target entry.

3. The method of claim 2, wherein
    assigning to an application a user role in relation to a target entry further includes setting to a next value an attribute, here referred to as user number attribute, associated with the target entry; and
    whether the application is the only user of the target entry is determined at least by setting to a previous value the user number attribute, and wherein, if the user number attribute is then equal to a reference value, the application is determined to be the only user of the target entry.

4. The method of claim 1, wherein the directory is further configured so that a target entry can be pointed from more than one alias entry.

5. The method of claim 1, wherein the directory is further configured so that each alias entry can belong to more than one owner application.

6. The method of claim 5, wherein
    assigning to an application an owner role in relation to an alias entry further includes setting to a next value an attribute, here referred to as owner number attribute, associated with the alias entry; and
    whether the application is the only owner of the alias entry is determined at least by setting to a previous value the owner number attribute, and wherein, if the owner number attribute is then equal to a reference value, the application is determined to be the only owner of the alias entry.

7. A computer program including instructions configured, when executed on a computer, to cause the computer to carry out the method according to claim 1.

8. A controller for managing a directory stored on at least one server, wherein
    the directory includes a plurality of entries arranged in a tree structure, each entry including at least one attribute;
    the directory is configured so that a first entry can include an attribute pointing to a second entry, here referred to as target entry, the first entry being then here referred to as alias entry of the target entry; and
    the controller includes
        an assignor configured for assigning to an application an owner role in relation to an alias entry, an application to which an owner role is assigned in relation to an alias entry being here referred to as owner of the alias entry, and wherein each alias entry can belong to one or more owner applications;
        a receiver configured for receiving a request, from an application which is either owner of the alias entry or not, to delete the alias entry; and,
        a determiner configured for determining if a condition, here referred to as deletion condition, is satisfied, and, if so,
        when the deletion condition includes that the application is the only owner of the alias entry, deleting the alias entry; and
        when the deletion condition includes that the application is not the only owner of the alias entry, releasing the owner role for the application in relation to the alias entry.

9. The controller of claim 8, further including
    a further assignor for assigning to an application a user role in relation to a target entry, an application to which a user role is assigned in relation to a target entry being here referred to as user of the target entry; wherein
    the request that the receiver is configured for receiving is additionally a request to delete the target entry to which the alias entry points;
    the determiner is further configured for deleting the target entry if the deletion condition is satisfied; and
    the deletion condition further includes that the application is the only user of the target entry.

10. The controller of claim 9, wherein
    the further assignor is further configured, when assigning to an application a user role in relation to a target entry, for setting to a next value an attribute, here referred to as user number attribute, associated with the target entry; and
    the controller is further configured so that whether the application is the only user of the target entry is determined at least by setting to a previous value the user number attribute, and wherein, if the user number attribute is then equal to a reference value, the application is determined to be the only user of the target entry.

11. The controller of claim 8, wherein the directory is further configured so that a target entry can be pointed from more than one alias entry.

12. The controller of claim 8, wherein the directory is further configured so that each alias entry can belong to more than one owner application.

13. The controller of claim 12, wherein
the assignor is further configured, when assigning to an application an owner role in relation to an alias entry, for setting to a next value an attribute, here referred to as owner number attribute, associated with the alias entry; and
the controller is further configured so that whether the application is the only owner of the alias entry is determined at least by setting to a previous value the owner number attribute, and wherein, if the owner number attribute is then equal to a reference value, the application is determined to be the only owner of the alias entry.

14. The controller of claim 8, wherein the directory is any one of a lightweight directory access protocol (LDAP) directory and a X.500 directory.

15. The controller of claim 8, hosted on any one of a home location register, a home subscriber server, an authentication center server, and a common user database server.

16. A server including a directory, wherein
the directory includes a plurality of entries arranged in a tree structure, each entry including at least one attribute;
the directory is configured so that a first entry can include an attribute pointing to a second entry, here referred to as target entry, the first entry being then here referred to as alias entry of the target entry;
the directory further includes at least one of an attribute associated with a target entry, the attribute including a value representing a number of applications using the target entry, so that it can be determined based on the attribute whether an application is or not the only user of the target entry; and an attribute associated with an alias entry, the attribute including a value representing a number of applications owning the alias entry, so that it can be determined based on the attribute whether an application is or not the only owner of the alias entry;
wherein, if the application is the only owner of the alias entry, the alias entry can be deleted, upon deletion request; and
wherein, if the application is not the only owner of the alias entry, the application can be discounted from the number of applications owning the alias entry, upon deletion request.

17. A system including
at least one server, here referred to collectively as directory server, including a directory, the directory including a plurality of entries arranged in a tree structure, each entry including at least one attribute, and the directory being configured so that a first entry can include an attribute pointing to a second entry;
a server, here referred to as controller server, including a controller
wherein the controller includes:
an assignor configured for assigning to an application an owner role in relation to an alias entry, an application to which an owner role is assigned in relation to an alias entry being here referred to as owner of the alias entry, and wherein each alias entry can belong to one or more owner applications;
a receiver configured for receiving a request, from an application which is either owner of the alias entry or not, to delete the alias entry; and,
a determiner configured for determining if a condition, here referred to as deletion condition, is satisfied, and, if so,
when the deletion condition includes that the application is the only owner of the alias entry, deleting the alias entry; and
when the deletion condition includes that the application is not the only owner of the alias entry, releasing the owner role for the application in relation to the alias entry; and
at least one server, each referred to here as application-hosting server, each hosting at least one application configured to interact with the directory server through the controller server, and configured at least to send a request, to the controller server, to delete an alias entry of the directory.

18. The system of claim 17, wherein at least one of the at least one application-hosting server is any one of a home location register, a home subscriber server, an authentication center server, and a common user database server.

* * * * *

UNITED STATES PATENT AND TRADEMARK OFFICE
CERTIFICATE OF CORRECTION

PATENT NO. : 8,819,073 B2
APPLICATION NO. : 13/257077
DATED : August 26, 2014
INVENTOR(S) : Ahlin et al.

It is certified that error appears in the above-identified patent and that said Letters Patent is hereby corrected as shown below:

On Title Page 2, in Item (56), under "OTHER PUBLICATIONS", in Column 2, Line 11, delete "Director" and insert -- Directory --, therefor.

In the Specification

In Column 16, Line 63, delete "$12_7$" and insert -- $12_T$ --, therefor.

Signed and Sealed this
Eleventh Day of August, 2015

Michelle K. Lee
*Director of the United States Patent and Trademark Office*